United States Patent
Lorenz et al.

(10) Patent No.: US 12,091,543 B2
(45) Date of Patent: Sep. 17, 2024

(54) PROCESS FOR PRODUCING POLYOXYALKYLENE-POLYOL MIXTURES

(71) Applicant: Covestro Intellectual Property GmbH & Co. KG, Leverkusen (DE)

(72) Inventors: Klaus Lorenz, Dormagen (DE); Elena Rojo-Wiechel, Bonn (DE); Elena Frick-Delaittre, Cologne (DE); Martin Marazita, Langenfeld (DE); Reinhard Albers, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 428 days.

(21) Appl. No.: 17/611,942

(22) PCT Filed: May 19, 2020

(86) PCT No.: PCT/EP2020/063904
§ 371 (c)(1),
(2) Date: Nov. 17, 2021

(87) PCT Pub. No.: WO2020/239525
PCT Pub. Date: Dec. 3, 2020

(65) Prior Publication Data
US 2022/0220304 A1    Jul. 14, 2022

(30) Foreign Application Priority Data
May 24, 2019 (EP) .................... 19176341

(51) Int. Cl.
*C08L 71/02* (2006.01)
*C08G 18/48* (2006.01)
*C08G 18/72* (2006.01)
*C08G 65/26* (2006.01)
*C08G 65/332* (2006.01)

(52) U.S. Cl.
CPC .......... *C08L 71/02* (2013.01); *C08G 18/4804* (2013.01); *C08G 18/72* (2013.01); *C08G 65/26* (2013.01); *C08G 65/332* (2013.01)

(58) Field of Classification Search
CPC ..... C08L 71/02; C08G 18/4804; C08G 18/72; C08G 65/332; C08G 65/26
See application file for complete search history.

(56) References Cited

U.S. PATENT DOCUMENTS

| | | |
|---|---|---|
| 2,834,748 A | 5/1958 | Bailey et al. |
| 2,917,480 A | 12/1959 | Bailey et al. |
| 2,941,967 A | 6/1960 | Moller et al. |
| 3,019,731 A | 2/1962 | Edwards et al. |
| 3,120,502 A | 2/1964 | Rudolf |
| 3,124,605 A | 3/1964 | Wagner |
| 3,152,162 A | 10/1964 | Fischer et al. |
| 3,153,002 A | 10/1964 | Wismer et al. |
| 3,190,927 A | 6/1965 | Patton, Jr. et al. |
| 3,201,372 A | 8/1965 | Wagner |
| 3,277,138 A | 10/1966 | Holtschmidt et al. |
| 3,330,782 A | 7/1967 | Poppelsdorf |
| 3,394,164 A | 7/1968 | McLellan et al. |
| 3,401,190 A | 9/1968 | Schmitt et al. |
| 3,404,109 A | 10/1968 | Milgrom |
| 3,454,606 A | 7/1969 | Brotherton et al. |
| 3,455,883 A | 7/1969 | Kamal et al. |
| 3,492,301 A | 1/1970 | Herweh et al. |
| 3,513,491 A | 5/1970 | Gordon |
| 3,517,039 A | 6/1970 | Kuno et al. |
| 3,567,763 A | 3/1971 | Emmons et al. |
| 3,620,984 A | 11/1971 | Dahm et al. |
| 3,629,308 A | 12/1971 | Bailey et al. |
| 3,644,457 A | 2/1972 | Konig et al. |
| 3,645,927 A | 2/1972 | Andres et al. |
| 3,654,106 A | 4/1972 | Wagner et al. |
| 3,694,510 A | 9/1972 | Moller et al. |
| 3,769,318 A | 10/1973 | Windemuth et al. |
| 3,814,707 A | 6/1974 | Moeller et al. |
| 3,823,145 A | 7/1974 | Louvar et al. |
| 3,829,505 A | 8/1974 | Herold |
| 3,832,311 A | 8/1974 | Windemuth et al. |
| 3,941,769 A | 3/1976 | Maasen et al. |
| 3,941,849 A | 3/1976 | Herold |

(Continued)

FOREIGN PATENT DOCUMENTS

| | | |
|---|---|---|
| DE | 1022789 B | 4/1958 |
| DE | 2618280 A1 | 11/1977 |

(Continued)

OTHER PUBLICATIONS

Handbuch Apparate, 1st ed., Essen, Vulkan-Verlag, 1990, pp. 188-208.
Ullmann's Encyclopedia of Industrial Chemistry, 5th ed., vol. B4, 1992, p. 167ff.
Ionescu et al., Advances in Urethanes Science and Technology, vol. 14, 1998, pp. 151-218.
Kunststoff-Handbuch, vol. VII, Munich, Carl-Hanser-Verlag, 1966, pp. 103-115, 453ff, 507-510.
Siefken, W., Justus Liebigs Annalen der Chemie, vol. 562, 1949, pp. 75-136.
The Polyurethanes Book, London, John Wiley & Sons, Ltd., 2002, pp. 127-136, 232-233, 261.

(Continued)

*Primary Examiner* — Rabon A Sergent
(74) *Attorney, Agent, or Firm* — Donald R. Palladino

(57) ABSTRACT

The present invention relates to a process for direct production of mixtures of short-chain high-functionality polyoxyalkylene polyols and long-chain low-functionality polyoxyalkylene polyols. The short-chain high-functionality polyoxyalkylene polyol component is obtained by alkylene oxide addition onto high-functionality H-functional starter compounds while the long-chain low-functionality polyoxyalkylene polyol component is correspondingly obtained by alkylene oxide addition onto low-functionality H-functional starter compounds. The invention further relates to the resulting polyoxyalkylene polyols and to the reaction thereof to produce polyurethanes.

15 Claims, 1 Drawing Sheet

(56) References Cited

U.S. PATENT DOCUMENTS

| | | |
|---|---|---|
| 4,088,665 A | 5/1978 | Findeisen et al. |
| 4,096,162 A | 6/1978 | Windemuth et al. |
| 4,143,003 A | 3/1979 | Haas et al. |
| 4,248,930 A | 2/1981 | Haas et al. |
| 4,294,719 A | 10/1981 | Wagner et al. |
| 4,332,936 A | 6/1982 | Nodelman |
| 4,344,855 A | 8/1982 | Schafer et al. |
| 4,348,536 A | 9/1982 | Blahak et al. |
| 4,507,475 A | 3/1985 | Straehle et al. |
| 4,521,548 A | 6/1985 | Christen et al. |
| 5,158,922 A | 10/1992 | Hinney et al. |
| 5,470,813 A | 11/1995 | Le-Khac |
| 5,536,883 A | 7/1996 | Le-Khac |
| 5,585,413 A | 12/1996 | Nagashima |
| 5,627,120 A | 5/1997 | Le-Khac |
| 5,637,673 A | 6/1997 | Le-Khac |
| 5,712,216 A | 1/1998 | Le-Khac et al. |
| 5,714,428 A | 2/1998 | Le-Khac |
| 5,786,405 A | 7/1998 | Schilling et al. |
| 5,811,566 A | 9/1998 | Watabe et al. |
| 6,197,839 B1 | 3/2001 | Genz et al. |
| 6,376,625 B1 | 4/2002 | Cosman et al. |
| 6,696,383 B1 | 2/2004 | Le-Khac et al. |
| 6,827,858 B2 | 12/2004 | Bader et al. |
| 7,008,900 B1 | 3/2006 | Hofmann et al. |
| 9,284,401 B2 | 3/2016 | Lorenz et al. |
| 2004/0167316 A1 | 8/2004 | Anderson et al. |
| 2005/0222380 A1 | 10/2005 | Peters et al. |
| 2009/0048420 A1 | 2/2009 | Lorenz et al. |
| 2010/0099788 A1 | 4/2010 | Lorenz et al. |
| 2011/0021738 A1 | 1/2011 | Lorenz |
| 2019/0161577 A1 | 5/2019 | Lorenz et al. |

FOREIGN PATENT DOCUMENTS

| | | |
|---|---|---|
| DE | 2636787 A1 | 2/1978 |
| DE | 147469 A3 | 4/1981 |
| DE | 216248 A1 | 12/1984 |
| DE | 219204 A1 | 2/1985 |
| DE | 4209358 A1 | 9/1993 |
| DE | 19628145 A1 | 1/1998 |
| DE | 10237910 A1 | 2/2004 |
| DE | 10237914 A1 | 2/2004 |
| EP | 1512707 A2 | 3/2005 |
| GB | 843841 A | 8/1960 |
| GB | 848671 A | 9/1960 |
| GB | 874430 A | 8/1961 |
| GB | 889050 A | 2/1962 |
| GB | 965474 A | 7/1964 |
| GB | 994890 A | 6/1965 |
| GB | 1072956 A | 6/1967 |
| GB | 1086404 A | 10/1967 |
| GB | 1091949 A | 11/1967 |
| GB | 1267011 A | 3/1972 |
| GB | 1303201 A | 1/1973 |
| GB | 1530225 A | 10/1978 |
| JP | H06157743 A | 6/1994 |
| RO | 118433 B1 | 5/2003 |
| WO | 9620972 A2 | 7/1996 |

OTHER PUBLICATIONS

International Search Report, PCT/EP2020/063904, date of mailing: Jul. 24, 2020, Authorized officer: Rafael Kiebooms.

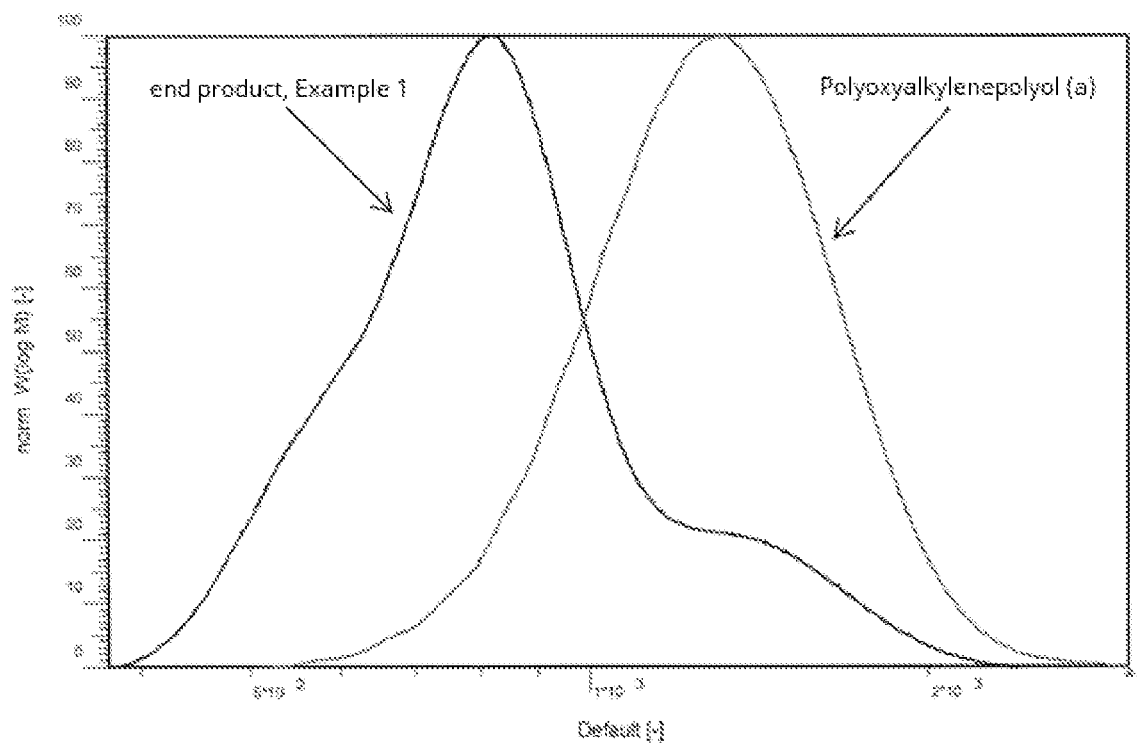

PROCESS FOR PRODUCING POLYOXYALKYLENE-POLYOL MIXTURES

CROSS-REFERENCE TO RELATED APPLICATION

This application is a national stage application under 35 U.S.C. § 371 of PCT/EP2020/063904, filed May 19, 2020, which claims the benefit of European Application No. 19176341.6, filed May 24, 2019, each of which is incorporated herein by reference.

FIELD

The present invention relates to a process for direct production of mixtures of short-chain high-functionality polyoxyalkylene polyols and long-chain low-functionality polyoxyalkylene polyols. The short-chain high-functionality polyoxyalkylene polyol component is obtained by alkylene oxide addition onto high-functionality H-functional starter compounds while the long-chain low-functionality polyoxyalkylene polyol component is correspondingly obtained by alkylene oxide addition onto low-functionality H-functional starter compounds. High-functionality H-functional starter compounds in the context of the invention are to be understood as meaning compounds which on average comprise at least three Zerewitinoff-active hydrogen atoms (for example hydroxyl and/or amine functionalities). Low-functionality H-functional starter compounds in the context of the invention are to be understood as meaning compounds which on average comprise not more than 3 Zerewitinoff-active hydrogen atoms (for example hydroxyl and/or amine functionalities).

A hydrogen bonded to N, O or S is referred to as Zerewitinoff-active hydrogen when it affords methane by reaction with methylmagnesium iodide, by a method discovered by Zerewitinoff. Typical examples of compounds having Zerewitinoff-active hydrogen are compounds containing carboxyl, hydroxyl, amino, imino or thiol groups as functional groups.

BACKGROUND

Polyol formulations containing polyether polyols produced on the basis of high-functionality starter compounds such as for example sugars, oligosaccharides and polysaccharides, sugar alcohols (for example mannitol or sorbitol) and pentaerythritol are generally employed in polyurethane applications, in particular for producing rigid polyurethane foams used for insulation of refrigeration apparatuses, cool containers, pipes or else in buildings insulation. Polyol formulations based on such polyoxyalkylene polyols produced on the basis of high-functionality starter compounds may together with polyisocyanates be made into rigid foams, wherein insulating elements produced therefrom (for example refrigerator housings or insulation panels) may be rapidly removed from the foam molds without appreciable deformation of the insulation elements. Furthermore, rigid foams obtained on the basis of such polyol formulations should exhibit sufficient adhesion to outerlayers of any kind and also be capable of dissolving the amount of physical blowing agents (alkanes, cycloalkanes, hydrofluorocarbons, partially fluorinated olefins and the like) necessary for achieving the desired apparent density. It will be appreciated that it is also desirable for the individual components of such formulations to have a sufficiently low viscosity—this facilitates the handling of the substances for example during production of the formulations typically containing a plurality of individual polyol components.

It is customary to employ small amounts (for example from 2% to about 30% by weight based on the amount of all isocyanate-reactive formulation components) of long-chain polyols having equivalent molar masses of more than 340 g/mol, preferably more than 370 g/mol, particularly preferably more than 400 g/mol, in such rigid foam formulations. They impart the solubility of the physical blowing agent in the formulation and improve the adhesion to outer layers, for example the plastics of the inner housings of the refrigeration apparatuses or their metallic outer housings. On the other hand, it is important for obtaining good demolding properties for sufficient amounts of high-functionality and short-chain polyoxyalkylene polyols to be present in the formulations. These components have average functionalities of more than 3.5, preferably more than 4, particularly preferably 5 or more, and their molar mass equivalents are below 190 g/mol, preferably below 160 g/mol. These high-functionality and short-chain components are usually typically obtained by reacting melts of high-functionality starter compounds such as sorbitol or mixtures of such high-functionality components with reactive co-starters such as glycerol or glycols with alkylene oxides. Especially the co-use of sugars (for example octafunctional sucrose) as starters makes it possible to obtain very high-functionality polyether polyols which impart excellent demolding characteristics to the rigid foam formulations. A disadvantage of the use of sucrose is that it is meltable only with decomposition. Its use as a starter for the production of short-chain high-functionality polyether polyols therefore requires the co-use of reactive co-starters active as solvents such as glycerol or glycols, for example ethylene glycol or propylene glycol. Especially the latter contribute significantly to the reduced viscosity of the obtained co-started alkylene oxide adduct. However a major disadvantage of using difunctional co-starters is the accompanying loss in polyol mixed functionality which imparts the resulting rigid foams with suboptimal demolding properties.

There has therefore been no shortage of attempts at making high-functionality starter compounds, in particular sucrose, available to alkylene oxide additions with the aim of obtaining polyoxyalkylene polyols having the highest possible mixed functionalities coupled with the lowest possible viscosities.

U.S. Pat. No. 4,332,936 proposes using solvents for suspending the solid starter. DE 2241242 employs aromatic hydrocarbons for the same purpose. It has proven disadvantageous in both cases that valuable reactor volume must be provided for the solvent and the use of organic solvents is generally undesirable for reasons of sustainability and product hygiene.

In similar fashion, adducts of sugar (sucrose) and alkylene oxides (predominantly EO) are obtained in U.S. Pat. No. 3,153,002 by using water as solvent for the alkylene oxide addition. The disadvantage of this process is that water itself acts as a starter and short-chain glycols are formed.

DE 1 276 622 B1 uses very short-chain adducts of starter compounds with alkylene oxides as suspension media/solvents for the production of alkylene oxide adducts of high melting point/high-functionality starter compounds. The lack of a polyoxyalkylene polyol having a low OH number results in products having very high viscosities according to the process of DE 1 276 622 B1.

DD 147469 discloses co-use of other low molecular weight, but more easily meltable, co-starters such as TMP or glycerol in the alkylene oxide addition onto sucrose. DD 219204 also discloses reacting sucrose with alkylene oxides in the presence of other OH- or NH-functional co-starters, optionally together with starch or cellulose. According to the description, such co-starters may also have "very different" molar masses but these co-starters are not discussed in any detail. The examples of DD 219204 employ only low molecular weight co-starters.

DD 216248 employs as co-starters/solvents for solid or very high viscosity starter compounds alcohol condensates obtained by acid-catalyzed reactions, i.e. essentially oligomeric polyethers obtained by acid catalysis. Having regard to the molar mass of these condensation polyethers, it is stated at one point (Ex. 3) that these are rather short-chained and the minimum OH number for these co-starters is reported as 320 mg KOH/g.

DE 4209358 had for its object to inhibit secondary reactions that may occur when using high-functionality starter compounds that are solid or have a high viscosity at room temperature in alkylene oxide addition reactions and that result, for example, in discoloration or difficulty working up the polyoxyalkylene polyol (high residual potassium content in the case of KOH catalysis). The object is achieved by the use of small amounts (0.51-5% based on the total batch) of alkoxylatable aliphatic amines in addition to the actual starters. Further liquid, low molecular weight co-starters may also be co-used but nothing is said about their structure.

Patent application DE 10237910 claims the following process mode for production of very high-functionality polyethers having a high OHN: A water-soluble starter component (preferably sorbitol) is initially charged together with the catalyst (KOH), another solid starter (here preferably sucrose) is then added and the resulting mixture is subjected to gentle dewatering under vacuum. This affords a very homogeneous melt solution of the two starter components in one another, and the process also avoids subjecting the sucrose content to high thermal stresses at the reactor walls. After dewatering, the alkoxylation is performed according to a known process mode. The initial mixing of sucrose together with sorbitol is said to lead to lower viscosities than the mixing of the individual components at high functionalities. Further co-starters may optionally also be used, but no details of their chain length/equivalent weight are given. In a very similar manner, patent application DE 102 37 914 A1 also describes the production of such starter melts, here with the aim of obtaining low-viscosity polyoxyalkylene polyols from glucose syrup and sorbitol. Both in the process according to DE 102 37 910 A1 and in the process according to DE 102 37 914 A1, the absence of the polyoxyalkylene polyol having a low OH number has the result that the end products have high viscosities and these polyoxyalkylene polyols therefore cannot be subjected or at least cannot be directly subjected to further reaction.

SUMMARY

The prior art thus does not provide a production process which allows direct production of a homogeneous monophasic mixture from one or more low-functionality long-chain polyoxyalkylene polyol components and short-chain higher-functionality polyoxyalkylene polyol components, wherein the resulting polyoxyalkylene polyol mixtures have industrially manageable viscosities allowing direct further processing into downstream products, such as, for example, polyurethanes. Direct production of such a mixture is to be understood as meaning the combination of the two polyoxyalkylene polyol components, i.e. a first building block consisting of one or more low-functionality long-chain polyoxyalkylene polyols and a second building block consisting of one or more short-chain higher-functionality polyoxyalkylene polyols in situ during the addition of the alkylene oxide(s) onto the short-chain higher-functionality starter component(s). This makes it possible to avoid separate handling of the high-viscosity short-chain alkylene oxide adduct of the high-functionality starter(s).

The present invention accordingly has for its object to provide a direct, simplified process for producing a single-phase, homogeneous mixture of one or more low-functionality long-chain polyoxyalkylene polyol components and at least two short-chain higher-functionality polyoxyalkylene polyol components having viscosities industrially manageable for direct further processing into downstream products, such as, for example, polyurethanes.

BRIEF DESCRIPTION OF THE DRAWING

Various features and characteristics of the inventions described in this specification may be better understood by reference to the accompanying FIGURE, in which:

FIG. 1 shows an excerpt of a size exclusion chromatogram of the final product obtained in example 1 and the polyoxyalkylene polyol (a) (difunctional, OH #=112) used in this example as long chain diluent.

DETAILED DESCRIPTION

This object was surprisingly achieved by a process for producing a polyoxyalkylene polyol mixture comprising at least 3 polyoxyalkylene polyols (a) (b) and (c), wherein the average OH number of the polyoxyalkylene polyol mixture is 290-560 mg KOH/g and the OH number has been determined according to the procedure of DIN 53240, wherein the calculated average OH number of the polyoxyalkylene polyols (b) and (c) is at least 360 mg KOH/g and the polyoxyalkylene polyol mixture is obtained by reacting a mixture comprising at least one polyoxyalkylene polyol (a), at least one H-functional starter substance (b') and at least one H-functional starter substance (c') with an OH-reactive compound optionally in the presence of a catalyst, wherein the process comprises the steps of i) providing a mixture (i) comprising the polyoxyalkylene polyol (a), the H-functional starter substance (b') and the H-functional starter substance (c');

ii) reacting the mixture (i) with the OH-reactive compound optionally in the presence of the catalyst;

wherein the polyoxyalkylene polyol (a) has a functionality F(a) of 2 to 3 and a calculated OH number of 60 to 168 mg KOH/g, wherein the H-functional starter substance (b') has a functionality F(b') of 3 to 8 and a calculated molar mass of at least 60 g/mol, wherein the H-functional starter substance (c') has a functionality F(c') of 3 to 8 and a calculated molar mass of at least 60 g/mol, wherein the H-functional starter substance (b') is distinct from the H-functional starter substance (c'), wherein the melting temperature of the H-functional starter substance (b') and/or of the H-functional starter substance (c') is less than 150° C. and the calculated number-average functionality of the mixture of the H-functional starter substances (b') and (c') is at least 4.5, and wherein the difference between the calculated average OH number of the polyoxyalkylene polyols (b) and (c) and the OH number of the polyoxyalkylene polyol (a) is between 295 and 405 mg KOH/g.

In one embodiment, the reacting of the mixture (i) with the OH-reactive compound in step (ii) is carried out in the presence of a catalyst, wherein said catalyst is a basic catalyst, a Brönsted-acidic catalyst, a Lewis-acidic catalyst and/or a double metal cyanide catalyst, preferably a basic catalyst.

In the process according to the invention, the functionality F(a) of 2 to 3 of the polyoxyalkylene polyol (a) is a hydroxyl functionality (OH functionality).

Suitable polyoxyalkylene polyols (a) have average starter functionalities between 2 and 3. Suitable polyoxyalkylene polyols (a) are obtainable, for example, by addition of alkylene oxides onto hydroxyl-containing starter compounds (a') such as, for example, ethylene glycol, 1,2-propylene glycol, 1,3-propylene glycol, the various isomers of butanediol, the various isomers of hexanediol, or else cyclic diols such as the various isomers of cyclohexanediol. Compounds having phenolic hydroxyl groups such as bisphenol A or bisphenol F and the isomers of dihydroxybenzene are likewise suitable starter compounds (a'). Trifunctional or mixed-functionality starter compounds are for example trimethylolpropane, glycerol and castor oil. Suitable starter compounds for obtaining polyoxyalkylene polyols (a) further include amine-containing starter compounds such as triethanolamine, diethanolamine and ethanolamine, as well as N-methylethanolamine, N-methyldiethanolamine, N-alkylamines or else N-alkylamines, which in turn bear further tertiary amino groups in the alkyl radical, for example N, N-dimethylaminopropylamine. An average starter functionality between 2 and 3 can also be established, for example, by using mixtures of di- and trifunctional starter compounds (a'). It will be appreciated that it is also possible to produce such average starter functionalities by mixing difunctional starter compounds with starter compounds having a functionality of greater than 3. Such starter compounds are for example pentaerythritol, sorbitol or ethylenediamine.

Suitable starter substances (b') and (c') have functionalities of 3 to 8. Suitable compounds are, for example, those selected from the group consisting of glycerol, trimethylolpropane (TMP), triethanolamine, mono-, oligo- and polysaccharides, pentaerythritol, dipentaerythritol, tripentaerythritol, sorbitol, cyclic polyols, for example inositol, polyamines, for example compounds based on high-functionality polynuclear aniline/formaldehyde condensation products ("polymeric MDA"), isomers/isomer mixtures of tolylenediamine (in particular 2,4-TDA, 2,6-TDA, 2,3-TDA, 3,4-TDA) and aliphatic amines such as ethylenediamine Short-chain alkylene oxide adducts of such starter compounds are likewise, but less preferably, employable. Preferably employed as starter substances (b') and (c') are sucrose, sorbitol, glycerol, TMP, the isomers of tolylenediamine and/or ethylenediamine, very particularly preferably sucrose, sorbitol, glycerol and TMP. It is especially preferable when one of the starter substances (b') or (c') is sucrose.

The calculated number-average functionality of the mixture of the H-functional starter substances (b') and (c') is at least 4.5 and preferably at least 5. At least one of the starter substances (b') and (c') has a melting point of less than 150° C. The H-functional starter substances (b') and (c') preferably have OH and/or NH numbers of more than 800 mg KOH/g.

The at least one starter compound (b') and the at least one starter compound (c') are suspended, dispersed or dissolved in the at least one polyoxyalkylene polyol (a) in a reactor system suitable for performing alkylene oxide addition reactions. It will be appreciated that the ratio between the two starter compounds on the one hand and the at least one polyoxyalkylene polyol (a) may be varied. The ratio chosen in each case depends on the desired product mix, though it will be appreciated that sufficient stirrability of the suspension, dispersion or solution of the starter compounds in the at least one polyoxyalkylene polyol (a) must be ensured, so that i) uniform reaction of the starter compounds (b') and (c') is achieved and thus ii) the resulting heat of reaction can be removed sufficiently effectively. The process is preferably performed such that the proportion of the at least one polyoxyalkylene polyol (a) in the finished product, i.e. the mixture of the at least one polyoxyalkylene polyol (a), the at least one polyoxyalkylene polyol (b) and the at least one polyoxyalkylene polyol (c) is 2% to 30% by weight. The arithmetic average functionality of the mixture of the at least one starter compound (b') and the at least one starter compound (c') is between 4.5 and 7.5, preferably between 5.0 and 7.5.

The suspension, dispersion or solution of the at least one starter compound (b') and the at least one starter compound (c') in the at least one polyoxyalkylene polyol (a) is admixed with a catalyst. Double metal cyanide compounds (DMC compounds) may be added as catalysts for example. DMC catalysts, as described for example in U.S. Pat. Nos. 5,470,813, 6,696,383, EP-A 0 700 949, EP-A 0 743 093, EP-A 0 761 708, WO-A 97/40086, WO-A 98/16310 and WO-A 00/47649, have a high activity in alkylene oxide addition reactions onto starter compounds having Zerewitinoff-active hydrogen atoms and enable production of polyether polyols at very low catalyst concentrations (100 ppm or lower), so that removal of the DMC catalyst from the polyether polyol before processing thereof into polyurethanes, for example polyurethane foams, is no longer required. This markedly enhances the economy of industrial polyether polyol production. The process according to the invention may alternatively also be catalyzed by Lewis acids, such as boron trifluoride etherate for example. However, such catalysts are of secondary importance due to their propensity for forming byproducts.

In one embodiment of the process according to the invention, the basic catalyst is an alkali metal hydroxide, alkaline earth metal hydroxide and/or amine, preferably an amine.

Preferably employed in the process according to the invention are basic catalysts, such as for example alkali metal hydrides, alkali metal carboxylates (for example those of monofunctional carboxylic acids), alkali metal hydroxides, alkali metal alkoxides (for example those of monofunctional alcohols) or amines. An overview of amines suitable for the process according to the invention has been given by M. Ionescu et al. in "Advances in Urethanes Science and Technology", 1998, 14, p. 151-218. For example, it is possible to use N,N-dimethylbenzylamine, dimethylaminopropanol, N-methyldiethanolamine, trimethylamine, triethylamine, N,N-dimethylcyclohexylamine, N-methylpyrrolidine, N,N,N',N'-tetramethylethylenediamine, diazabicyclo[2.2.2]octane, 1,4-dimethylpiperazine, N-methylmorpholine, unsubstituted imidazole and/or alkyl-substituted imidazole derivatives. Basic catalysts used with particular preference in the process of the invention are alkali metal hydroxides (for example sodium hydroxide, potassium hydroxide or cesium hydroxide) or amines. The alkali metal hydroxides may be used as a solid or as highly concentrated aqueous solutions. It is very particularly preferable when the process according to the invention uses amines as catalysts, and among these in turn preferably imidazole or alkyl-substituted imidazole derivatives (for example N-methylimidazole).

The basic catalysts are generally employed in an amount based on the amount of end product (i.e. based on the polyoxyalkylene mixture to be produced comprising at least 3 polyoxyalkylene polyols (a) (b) and (c)) of 0.004% to 0.8% by weight, preferably 0.004% to 0.2% by weight. When using catalysts based on alkali metal hydroxide or when using N-methyldiethanolamine, it must be noted that small amounts of dihydroxy-functional polyether molecules may be formed during the alkylene oxide addition reaction. When alkali metal hydroxides are used, the water introduced during addition of the aqueous catalyst solution and the water formed upon reaction of the Zerewitinoff-active hydrogens with the alkali metal hydroxide may also be removed via an (optionally vacuum-assisted) distillation step before commencement of the alkylene oxide addition. If the at least one starter compound (b') or the at least one starter compound (c') comprises an amine the addition of the catalyst to the reaction mixture can also be effected with a delay, i.e. only after addition of a certain amount of alkylene oxide to the catalyst-free reaction mixture.

Continuously metered into the mixture of the at least one starter compound (b'), the at least one starter compound (c') and the at least one polyoxyalkylene polyol (a) is an OH-reactive compound, preferably an alkylene oxide, preferably under an inert gas atmosphere. The alkylene oxide is preferably at least one selected from the group consisting of ethylene oxide, propylene oxide, 1,2-butylene oxide, 2,3-butylene oxide and styrene oxide. Ethylene oxide, propylene oxide or a mixture of propylene oxide and ethylene oxide are particularly preferred. The alkylene oxides may be introduced into the reaction mixture individually, in admixture or successively. If the alkylene oxides are metered in successively, the polyoxyalkylene polyol mixtures produced contain polyether chains having block structures. Products having ethylene oxide end blocks are, for example, characterized by an increased proportion of primary end groups, thus imparting the polyoxyalkylene polyol mixture with increased reactivity towards isocyanates. The selection of the alkylene oxide used in each case and the choice of arrangement thereof within the polyether chains are made having regard to the desired properties of the polyoxyalkylene polyol mixture. It is very particularly preferred to use exclusively propylene oxide for the production of the polyoxyalkylene polyol mixtures.

In one embodiment of the process according to the invention, the polyoxyalkylene polyols (a) are produced in situ directly before addition of the at least one starter compound (b') and the at least one starter compound (c') in the same reactor in which the polyoxyalkylene polyol mixtures according to the invention are subsequently also prepared. To this end, suitable starter compounds (a') as mentioned hereinabove, for example, are reacted in the reactor system suitable for performing alkylene oxide addition reactions initially in the absence of the starter compounds (b') and (c') with alkylene oxides at least in some cases in the presence of catalysts until the desired molar mass of the polyoxyalkylene polyol (a) has been achieved. Subsequently, the at least one starter compound (b') and the at least one starter compound (c') are then added and, optionally with addition of further catalyst, the alkylene oxide addition is continued until the desired polyoxyalkylene polyol mixture is obtained.

Against the backdrop of the scarcity of petrochemical resources and the disadvantageous assessment of fossil raw materials in life cycle analyses, the use of raw materials from renewable sources is becoming increasingly important also in the production of polyols suitable for the polyurethane industry. In the process according to the invention for producing polyoxyalkylene mixtures, triglycerides such as soybean oil, rapeseed oil, palm kernel oil, palm oil, linseed oil, sunflower oil, herring oil, sardine oil, lesquerella oil and castor oil or other fatty acid esters according to EP 1923417 may be added to the process in amounts of 10-50% by weight, based on the amount of end product, before or during the alkylene oxide addition. Using triglycerides or fatty acid esters without hydroxyl groups makes it possible to save the amount of alkylene oxide corresponding to the triglyceride or fatty acid ester, assuming a constant OH number. This affords polyoxyalkylene polyester polyol mixtures having the oils completely incorporated in their structure by transesterification reactions proceeding simultaneously with the alkylene oxide addition, said oils therefore being detectable in the end product only in very small amounts, if at all.

The OH-reactive compounds, in particular alkylene oxides, are continuously supplied to the reactor in conventional fashion in such a way that the safety-related pressure limits of the employed reactor system are not exceeded. Especially in the case of metered addition of ethylene oxide-containing alkylene oxide mixtures or pure ethylene oxide, it should be ensured that a sufficient partial inert gas pressure is maintained within the reactor during the startup and metering phase. This can be established, for example, by means of noble gases or nitrogen. The alkylene oxides may be supplied to the reactor in different ways: one option is metered addition into the gas phase or directly into the liquid phase, for example via an immersed tube or a distributor ring close to the reactor base in a zone with good mixing. In the case of metered addition into the liquid phase, the metering units should be designed so as to be self-emptying, for example by introduction of the metering holes at the lower end of the distributor ring. Advantageously, it is possible by means of apparatus measures, for example the mounting of non-return valves, to prevent backflow of reaction medium into the alkylene oxide-conducting lines and metering units or into the alkylene oxide reservoir vessel. It is preferable when the reaction with the OH-reactive compounds, preferably the alkoxylation, is carried out at a temperature of 70° C. to 170° C., particularly preferably at a temperature of 100° C. to 150° C. The temperature may be varied within the described limits during the alkylene oxide metering phase: In order to achieve an optimal balance between high alkylene oxide conversion and low by-product formation in the case of use of sensitive starter compounds (for example sucrose), it is possible first to alkoxylate at low reaction temperatures (for example at 70° C. to 110° C.), and only when starter conversion is sufficient (i.e. as soon as at least 50% by weight of the starter compounds used have reacted with alkylene oxide at at least one Zerewitinoff-active hydrogen atom), to move to higher reaction temperatures (for example to from 110° C. to 130° C.). Postreactions may optionally be performed at higher temperatures (i.e. after raising the temperature to 100° C. to 170° C., preferably 100° C. to 150° C.). The temperature of the exothermic alkylene oxide addition reaction is kept at the desired level by cooling. According to the prior art relating to the design of polymerization reactors for exothermic reactions (for example Ullmann's Encyclopedia of Industrial Chemistry, volume B4, page 167ff., 5th edition, 1992), such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers. These should advantageously be configured such that effective cooling is possible even at commencement of the metering phase, i.e. at a low fill level and/or in the presence of possibly heterogeneous reactor contents (for example in the case of solid dispersions or suspensions).

Generally, good mixing of the reactor contents should be ensured in all reaction phases through design and use of standard stirring units, suitable stirring units here being especially stirrers arranged over one or more levels or stirrer types which act over the full fill height (see, for example, Handbuch Apparate; Vulkan-Verlag Essen, 1st ed. (1990), p. 188-208). Of particular technical relevance here is a mixing output which is introduced on average over the entire reactor contents and is generally in the range from 0.2 to 5 W/L, with correspondingly higher local power inputs in the region of the stirrer units themselves and possibly in the case of relatively low fill levels. In order to achieve an optimal stirring effect, combinations of baffles (e.g. flat or tubular flow baffles) and cooling coils (or cooling candles) may be arranged within the reactor according to general prior art, and these may also extend across the vessel base. The stirring power of the mixing unit may also be varied as a function of the fill level during the metering phase, in order to ensure a particularly high mixing energy input in critical reaction phases. For example, it may be advantageous to particularly vigorously mix solids-containing dispersions which may be present at the start of the reaction, for example, in the case of use of sucrose. Moreover, particularly when solid H-functional starter compounds are used, it should be ensured through the selection of the stirrer unit that sufficient dispersion of the solids in the reaction mixture is assured. Preference is given here to using stirrer stages with close base clearance, and particularly stirrer units suitable for suspension. In addition, the stirrer geometry should contribute to reducing the foaming of reaction products. The foaming of reaction mixtures can be observed, for example, after the end of the metering and postreaction phase, when residual alkylene oxides are additionally removed under vacuum, at absolute pressures in the range from 1 to 500 mbar. For such cases, stirrer units that achieve continuous mixing of the liquid surface have been found to be suitable. As required, the stirrer shaft has a base bearing and optionally further support bearings within the vessel. The stirrer shaft may be mounted from the top or bottom (with a central or eccentric arrangement of the shaft).

Alternatively, it is also possible to achieve the necessary mixing exclusively via a heat exchanger conducted pumped circulation system, or to operate this pumped circulation system as a further mixing component in addition to the stirrer unit, in which case the reactor contents are pumped in circulation as required (typically 1 to 50 times per hour). The specific mixing output introduced by means of pumped circulation, for example by means of an external heat exchanger or, in the case of recycling into the reactor, by means of a nozzle or injector, likewise amounts to values averaging from 0.2 to 5 W/L, this being based on the liquid volume present in the reactor and the pumped circulation system at the end of the reaction phase.

A wide variety of different reactor types are suitable for the performance of the process of the invention. Preference is given to using cylindrical vessels having a height/diameter ratio of 1:1 to 10:1. Useful reactor bases include hemispherical, dished, flat or conical bases, for example.

The end of the metered addition of alkylene oxide or a change in the composition of the alkylene oxide mixture metered in may be followed by postreaction phases in which the decrease in the concentration of unreacted alkylene oxide can be quantified by monitoring the pressure. It is optionally possible to completely free the reaction mixture, after the last postreaction phase has ended, of small amounts of unconverted alkylene oxides under vacuum, for example at an absolute pressure of 1 to 500 mbar, or by stripping. Stripping removes volatile constituents, for example (residual) alkylene oxides, with introduction of inert gases and/or steam into the liquid phase with simultaneous application of vacuum (for example by passing inert gas through at an absolute pressure of 5 to 500 mbar). The removal of volatile constituents, for example of unconverted alkylene oxides, either under vacuum or by stripping, is generally effected at temperatures of 20 to 200° C., preferably at 50 to 160° C., and preferably at reaction temperature with stirring. Such stripping operations can also be performed in what are called stripping columns, in which an inert gas or steam stream is passed counter to the product stream. Preference is given to using stripping columns having random packings or internals for this purpose. Such stripping operations can also be conducted continuously by, for example, collecting the unstripped material in a buffer vessel and feeding it continuously to the stripping column therefrom. On attainment of constant pressure in the postreaction phase and optionally after removal of volatile constituents through vacuum and/or stripping, the product may be discharged from the reactor or sent for aftertreatment steps, in particular workup steps.

The crude polyoxyalkylene polyol mixture resulting from step ii) may optionally be subjected to work-up steps to remove any catalyst traces. In the case of alkylene oxide addition reactions catalysed with amines or high-activity DMC compounds, such aftertreatment steps are generally not required. The optional removal of the catalyst from the crude polyoxyalkylene polyol mixture resulting from step ii) may be carried out in different ways: For example, the basic catalyst can be neutralized with dilute mineral acids such as sulfuric acid or phosphoric acid. The salts formed during the neutralization are separated off, for example by filtration. Exceptions are the polyether polyol production processes described in EP-A 2028211 and WO-A 2009106244. Alternatively, the neutralization may be effected with hydroxycarboxylic acids (for example lactic acid, as described in WO-A 9820061 and US-A 2004167316). Likewise suitable for neutralization are carboxylic acids such as for example formic acid (cf. U.S. Pat. No. 4,521,548). The metal carboxylates formed after neutralization with carboxylic acids (for example hydroxycarboxylic acids or formic acid) are soluble in the polyether polyols to give a clear solution and removal of the salts may therefore be dispensed with here. The neutralization may also be carried out for example by addition of cyclic dicarboxylic anhydrides, such as phthalic anhydride, maleic anhydride, tetrahydrophthalic anhydride or succinic anhydride, to obtain salts which are likewise soluble in the polyoxyalkylene polyol mixtures according to the invention. Also possible is the use of ring-opening products of cyclic carboxylic anhydrides with polyols, i.e. of dicarboxylic acid half-esters, as neutralizing agents. It should finally be noted that the incompletely alkoxylated oxo acids of phosphorus are likewise suitable as neutralization acids. It is likewise possible to remove the catalyst by using acidic cation exchangers as described for example in DE-A 100 24 313. The catalyst may moreover be removed using adsorbents such as for example phyllosilicates (bentonite, attapulgite), diatomaceous earth or else synthetic magnesium silicates (such as AMBOSOL® or BriteSorb®). Such purification processes are described in RO 118433, U.S. Pat. No. 4,507,475, EP-A 0693513 and EP-A 1751213. Phase separation processes are in principle likewise possible but the water solubilities of the high-functionality constituents of the reaction mixture are generally too high for effective performance of phase separation processes. Phase separation processes are described, for example, in WO-A 0114456, JP-A 6-157743, WO-A 9620972 and U.S. Pat. No. 3,823,145.

It is recommended to perform the production of the polyoxyalkylene polyol mixtures according to the invention in the absence of oxygen. Even ready worked-up, salt-free and stabilizedpolyoxyalkylene polyol mixtures according to the invention are recommended to be handled and stored in the absence of oxygen. Inert gases suitable for this purpose are, for example, noble gases or nitrogen or carbon dioxide, noble gases or nitrogen being particularly suitable. The prevention of ingress of oxygen very substantially prevents product discoloration; this is especially true at elevated temperatures, which are generally utilized in order to facilitate the handling of the finished products through lowering of the product viscosity. Furthermore, under an inert gas atmosphere, a much lower level of peroxide groups also arises, these contributing to cleavage of the polyether chains to form further low molecular weight oxidative degradation products, for example acetaldehyde, methanol, formic acid, formic esters, acetone and formaldehyde. It is thus possible to minimize reductions in quality, lower the content of volatile organic compounds and prevent odor nuisance and impairment to health during the storage of the finished products.

The reaction of the mixture (i) with the OH-reactive compound, in particular with the alkylene oxide(s), carried out in step ii) is in practice carried out such that the alkylene oxide preferentially reacts with the Zerewitinoff-active hydrogens of the starter compounds (b') and (c') and practically does not react with the hydroxyl groups of the polyoxyalkylene compound (a), see FIG. 1. Without wishing to be bound to a particular theory, it is thought that this is attributable i) to the markedly higher number of Zerewitinoff-active hydrogen atoms bonded to the starter compounds (b') and (c') compared to the number of hydroxyl groups bonded to the polyoxyalkylene compounds (a) and/or that at commencement of the metered addition of the alkylene oxide(s) there is insufficient solubility of the mixture of the at least one starter compound (b'), the at least one starter compound (c') and the catalyst in the relatively nonpolar polyoxyalkylene polyol (a) and the starter compounds (b'), (c') and the catalyst therefore form a separate reaction system in which the reaction with the alkylene oxide(s) proceeds practically exclusively.

The polyoxyalkylene polyol mixtures according to the invention may be admixed with antioxidants (for example based on phenol derivatives and/or based on amines). When an alkali metal hydroxide is used to catalyze the alkylene oxide addition onto the employed starter compounds, it is advisable to add such antioxidants only after neutralization/removal of these catalyst traces, since this makes it possible to avoid discoloration of the polyoxyalkylene polyol mixtures.

The polyoxyalkylene polyol mixtures obtainable by the process according to the invention may be used as starting components for production of solid or foamed polyurethane materials and, less preferably, also to obtain polyurethane elastomers. The polyurethane materials and elastomers may also contain isocyanurate, allophanate and biuret structural units.

Production of these materials comprises
1. optionally mixing the polyether ester polyols according to the invention with further isocyanate-reactive components and reacting the resulting mixture with
2. organic polyisocyanates,
3. optionally in the presence of blowing agents,
4. in the presence of catalysts
5. optionally in the presence of other additives such as for example cell stabilizers.

Zur Reaktion Gebracht.

As further isocyanate-reactive components, the polyoxyalkylene polyol mixtures according to the invention may optionally be admixed with polyoxyalkylene polyols, polyester polyols, polycarbonate polyols, polyether carbonate polyols, polyester carbonate polyols, polyether ester carbonate polyols and/or low molecular weight chain extenders and/or crosslinkers having OH numbers or NH numbers of 6 to 1870 mg KOH/g.

Polyoxyalkylene polyols suitable therefor are obtainable, for example, by anionic polymerization of alkylene oxides in the presence of alkali metal hydroxides or alkali metal alkoxides as catalysts and with addition of at least one starter molecule containing 2 to 8 Zerewitinoff-active hydrogen atoms or by cationic polymerization of alkylene oxides in the presence of Bronsted or Lewis acids such as trifluoromethanesulfonic acid, perchloric acid, antimony pentachloride, boron trifluoride etherate or tris(pentafluorophenyl)borane. It will be appreciated that suitable catalysts also include those of the double metal cyanide complex type as described for example in U.S. Pat. Nos. 3,404,109, 3,829, 505, 3,941,849, 5,158,922, 5,470,813, EP-A 700 949, EP-A 743 093, EP-A 761 708, WO 97/40086, WO 98/16310 and WO 00/47649. Suitable alkylene oxides and a number of suitable starter compounds have already been described in the preceding paragraphs. Also suitable are, for example, tetrahydrofuran as the Lewis-acidic polymerizable cyclic ether and water as the starter molecule. The polyoxyalkylene polyols, preferably polyoxypropylene-polyoxyethylene polyols, preferably have number average molar masses of 200 to 8000 Da. Suitable polyoxyalkylene polyols further include polymer-modified polyoxyalkylene polyols, preferably graft polyoxyalkylene polyols, in particular those based on styrene and/or acrylonitrile, which are advantageously produced in the abovementioned polyoxyalkylene polyols by in-situ polymerization of acrylonitrile, styrene or preferably mixtures of styrene and acrylonitrile, for example in a weight ratio of 90:10 to 10:90, preferably 70:30 to 30:70, and also polyoxyalkylene polyol dispersions which contain inorganic fillers, polyureas, polyhydrazides, polyurethanes comprising bound tertiary amino groups and/or melamine as the disperse phase, typically in an amount of 1% to 50% by weight, preferably 2% to 25% by weight.

Suitable polyester polyols are producible for example from organic dicarboxylic acids having 2 to 12 carbon atoms and polyhydric alcohols, preferably diols, having 2 to 12 carbon atoms, preferably 2 to 6 carbon atoms. Contemplated dicarboxylic acids include for example: Succinic acid, glutaric acid, adipic acid, suberic acid, azelaic acid, sebacic acid, decanedicarboxylic acid, dodecanedicarboxylic acid, maleic acid, fumaric acid, phthalic acid, isophthalic acid and terephthalic acid. The dicarboxylic acids may be used either singly or in admixture with one another. Instead of the free dicarboxylic acids it is also possible to employ the corresponding dicarboxylic acid derivatives, for example dicarboxylic mono- and/or diesters of alcohols having 1 to 4 carbon atoms or dicarboxylic anhydrides. It is preferable to employ dicarboxylic acid mixtures of succinic, glutaric and adipic acid in quantity ratios of for example 20 to 35/40 to 60/20 to 36 parts by weight and in particular adipic acid. Examples of dihydric and polyhydric alcohols are ethanediol, diethylene glycol, 1,2- and 1,3-propanediol, dipropylene glycol, methyl-1,3-propanediol, 1,4-butanediol, 1,5-pentanediol, 3-methyl-1,5-pentanediol, 1,6-hexanediol, neopentyl glycol, 1,10-decanediol, 1,12-dodecanediol, glycerol, trimethylolpropane and pentaerythritol. Preference is given to using 1,2-ethanediol, diethylene glycol, 1,4-butanediol, 1,6-hexanediol, glycerol, trimethylolpropane or mixtures of at least two of the recited polyhydric alcohols, in particular mixtures of ethanediol, 1,4-butanediol and 1,6-hexanediol, glycerol and/or trimethylolpropane. Also employable are, for example, polyester polyols made from lactones, for example ε-caprolactone, or hydroxycarboxylic acids, for example hydroxycaproic acid and hydroxyacetic acid.

To produce the polyester polyols, the organic, aromatic or aliphatic polycarboxylic acids and/or polycarboxylic acid derivatives and polyhydric alcohols may be subjected to polycondensation up to the desired acid and OH numbers in the absence of catalyst or in the presence of transesterification catalysts, advantageously in an atmosphere of inert gases, for example nitrogen, helium or argon, and also in the melt at temperatures of 150° C. to 300° C., preferably 180° C. to 230° C., optionally under reduced pressure. The acid number is advantageously less than 10, preferably less than 2.5.

In a preferred production process, the esterification mixture is subjected to polycondensation at the abovementioned temperatures up to an acid number of 80 to 30, preferably 40 to 30, under standard pressure and subsequently at a pressure of less than 500 mbar, preferably 1 to 150 mbar. Contemplated esterification catalysts are, for example, iron, cadmium, cobalt, lead, zinc, antimony, magnesium, titanium and tin catalysts in the form of metals, metal oxides or metal salts. However, the polycondensation of aromatic or aliphatic carboxylic acids with polyhydric alcohols may also be performed in the liquid phase in the presence of diluents and/or entrainers, for example benzene, toluene, xylene or chlorobenzene, for azeotropic distillative removal of the water of condensation.

The ratio of dicarboxylic acid (derivative) and polyhydric alcohol to be chosen to obtain a desired OH number, functionality and viscosity, and the alcohol functionality to be chosen, may be simply determined by those skilled in the art.

Suitable polycarbonate polyols are those of the type known per se which are producible for example by reaction of diols, such as 1,2-propanediol, 1,4-butanediol, 1,6-hexanediol, diethylene glycol, triethylene glycol, tetraethylene glycol, oligo-tetramethylene glycol and/or oligo-hexamethylene glycol with diarylcarbonates and/or dialkyl carbonates, for example diphenyl carbonate, dimethyl carbonate and α-ω-bischloroformate or phosgene. The likewise suitable polyether carbonate polyols are obtained by copolymerization of cyclic epoxides and carbon dioxide; such copolymerizations are preferably performed under high pressure and catalyzed by double metal cyanide (DMC) compounds.

Low molecular weight, preferably tri- or tetrafunctional, crosslinkers or difunctional chain extenders may be added to the polyoxyalkylene polyol mixtures for use according to the invention to modify the mechanical properties, in particular the hardness, of the PUR materials. Suitable crosslinkers, for example tri- or tetrahydric alcohols and oligomeric polyoxyalkylene polyols having a functionality of 3 to 4, typically have molar masses of 90 to 300 Da. Suitable crosslinkers are for example glycerol, trimethylolpropane or pentaerythritol. Preferably employed chain extenders are alkanediols having 2 to 12 carbon atoms, for example ethanediol, 1,3-propanediol, 1,5-pentanediol, 1,6-hexanediol, 1,7-heptanediol, 1,8-octanediol, 1,9-nonanediol, 1,10-decanediol and in particular 1,4-butanediol and dialkylene glycols having 4 to 8 carbon atoms, for example diethylene glycol and dipropylene glycol. Also suitable are branched-chain and/or unsaturated alkanediols typically having not more than 12 carbon atoms, for example, 1,2-propanediol, 2-methyl-1,3-propanediol, 3-methyl-1,5-pentanediol, 2,2-dimethyl 1,3-propanediol, 2-butyl-2-ethyl-1,3-propanediol, 2-butene-1,4-diol and 2-butyne-1,4-diol, diesters of terephthalic acid with glycols having 2 to 4 carbon atoms, for example bis-ethylene glycol terephthalate or bis-1,4-butylene glycol terephthalate, and hydroxyalkylene ethers of hydroquinone or resorcinol, for example 1,4-di(β-hydroxyethyl)hydroquinone or 1,3-(β-ydroxyethyl)resorcinol. It is also possible to use alkanolamines having 2 to 12 carbon atoms such as ethanolamine, 2-aminopropanol and 3-amino-2,2-dimethylpropanol, N-alkyldialkanolamines, for example N-methyl- and N-ethyldiethanolamines, (cyclo)aliphatic diamines having 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines which may also be substituted at the aromatic radical by alkyl groups having 1 to 20, preferably 1 to 4, carbon atoms in the N-alkyl radical, such as N,N'-diethyl-, N,N'-di-sec-pentyl-, N,N'-di-sec-hexyl-, N,N'-di-sec-decyl- and N,N'-dicyclohexyl-p- or -m-phenylenediamine, N,N'-dimethyl-, N,N'-diethyl-, N,N'-diisopropyl-, N,N'-di-sec-butyl-, N,N'-dicyclohexyl-4,4'-diaminodiphenylmethane, N,N'-di-sec-butylbenzidine, methylenebis(4-amino-3-benzoic acid methyl ester), 2,4-chloro-4,4'-diaminodiphenylmethane and 2,4- and 2,6-tolylenediamine.

Also usable are mixtures of different chain extenders and crosslinkers with one another and mixtures of chain extenders and crosslinkers.

Suitable organic polyisocyanates are cycloaliphatic, araliphatic, aromatic and heterocyclic polyisocyanates, such as are described, for example, by W. Siefken in Justus Liebigs Annalen der Chemie, 562, pages 75 to 136, for example those of the formula Q(NCO)n in which n=2-4, preferably 2, and Q is an aliphatic hydrocarbon radical having 2-18, preferably 6-10, carbon atoms, a cycloaliphatic hydrocarbon radical having 4-15, preferably 5-10, carbon atoms, an aromatic hydrocarbon radical having 6-15, preferably 6-13, carbon atoms or an araliphatic hydrocarbon radical having 8-15, preferably 8-13, carbon atoms. Suitable compounds include, for example, ethylene diisocyanate, 1,4-tetramethylene diisocyanate, 1,6-hexamethylene diisocyanate (HDI), 1,12-dodecane diisocyanate, cyclobutane 1,3-diisocyanate, cyclohexane 1,3- and -1,4-diisocyanate and any desired mixtures of these isomers, 1-isocyanato-3,3,5-trimethyl-5-isocyanatomethylcyclohexane (DE-B 1 202 785, U.S. Pat. No. 3,401,190), 2,4- and 2,6-hexahydrotolylene diisocyanate and any desired mixtures of these isomers, hexahydro-1,3- and -1,4-phenylene diisocyanate, perhydro-2,4'- and -4,4'-diphenylmethane diisocyanate, 1,3- and 1,4-phenylene diisocyanate (DE A 196 27 907), 1,4-durene diisocyanate (DDI), 4,4'-stilbene diisocyanate (DE A 196 28 145), 3,3'-dimethyl-4,4'-biphenylene diisocyanate (DIBDI) (DE A 195 09 819), 2,4- and 2,6-tolylene diisocyanate (TDI) and any desired mixtures of these isomers, diphenylmethane 2,4'- diisocyanate and/or diphenylmethane 4,4'-diisocyanate (MDI) or naphthylene 1,5-diisocyanate (NDI).

Also suitable according to the invention are for example: triphenylmethane 4,4',4''-triisocyanate, polyphenyl-polymethylene polyisocyanates, as obtained by aniline-formaldehyde condensation and subsequent phosgenation and described for example in GB-A 874 430 and GB-A 848 671, m- and p-isocyanatophenylsulfonyl isocyanates according to U.S. Pat. No. 3,454,606, perchlorinated aryl polyisocyanates, as described in U.S. Pat. No. 3,277,138, polyisocyanates containing carbodiimide groups, as described in U.S. Pat. No. 3,152,162 and in DE-A 25 04 400, 25 37 685 and 25 52 350, norbornane diisocyanates according to U.S. Pat. No. 3,492,301, polyisocyanates containing allophanate groups, as described in GB-A 994 890, BE-B 761 626 and NL-A 7 102 524, polyisocyanates containing isocyanurate groups, as described in US-A 3 001 9731, in DE-C 10 22 789, 12 22 067 and 1 027 394 and in DE-A 1 929 034 and 2 004 048, polyisocyanates containing urethane groups, as described for example in BE-B 752 261 or in U.S. Pat. Nos. 3,394,164 and 3,644,457, polyisocyanates containing acylated urea groups according to DE-C 1 230 778, polyisocyanates containing biuret groups, as described in U.S. Pat. Nos. 3,124,605, 3,201,372 and 3,124,605 and in GB-B 889 050, polyisocyanates produced by telomerization reactions, as described in U.S. Pat. No. 3,654,106, polyisocyanates containing ester groups, as recited in GB-B 965 474 and 1 072 956, in U.S. Pat. No. 3,567,763 and in DE-C 12 31 688, reaction products of the abovementioned isocyanates with acetals according to DE C 1 072 385, and polyisocyanates containing polymeric fatty acids according to U.S. Pat. No. 3,455,883.

It is also possible to use the distillation residues containing isocyanate groups generated during industrial isocyanate production, optionally dissolved in one or more of the abovementioned polyisocyanates. Any desired mixtures of the abovementioned polyisocyanates may also be used.

It is preferable to employ the industrially readily available polyisocyanates, for example 2,4- and 2,6-tolylene diisocyanate and any desired mixtures of these isomers ("TDI"), polyphenyl polymethylene polyisocyanates as prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates"), especially modified polyisocyanates deriving from 2,4- and/or 2,6-tolylene diisocyanate or from 4,4'- and/or 2,4'-diphenylmethane diisocyanate. Naphthylene 1,5-diisocyanate and mixtures of the abovementioned polyisocyanates are also suitable.

It is also possible to use prepolymers containing isocyanate groups obtainable by reacting a subamount or the total amount of the polyether ester polyols for use according to the invention and/or a subamount or the total amount of the above described isocyanate-reactive components for optional admixture with the polyether ester polyols for use according to the invention with at least one aromatic di- or polyisocyanate from the group TDI, MDI, DIBDI, NDI, DDI, preferably with 4,4'-MDI and/or 2,4-TDI and/or 1,5-NDI, to afford a polyaddition product comprising urethane groups, preferably urethane groups and isocyanate groups. Such polyaddition products have NCO contents of 0.05 to 40.0% by weight. In a preferably employed embodiment, the prepolymers containing isocyanate groups are produced by reaction of exclusively higher molecular weight polyhydroxyl compounds, i.e. the polyoxyalkylene polyol mixtures for use according to the invention, and/or polyether ester polyols, polyether polyols, polyester polyols or polycarbonate polyols with the polyisocyanates, preferably 4,4'-MDI, 2,4-TDI and/or 1,5-NDI.

The prepolymers containing isocyanate groups may be produced in the presence of catalysts. However, it is also possible to produce the prepolymers containing isocyanate groups in the absence of catalysts and to add these to the reaction mixture for producing the PUR materials.

The blowing agent for optional use may be water which reacts in situ with the organic polyisocyanates or with the prepolymers comprising isocyanate groups to form carbon dioxide and amino groups, the latter in turn undergoing further reaction with further isocyanate groups to afford urea groups and thus acting as chain extenders. If water is added to the polyurethane formulation to adjust the desired density this is typically employed in amounts of 0.001% to 6.0% by weight based on the weight of components 1, 4 and 5.

Blowing agents employable as physical blowing agents instead of water or preferably in combination with water also include gases or volatile inorganic or organic substances which evaporate under the influence of the exothermic polyaddition reaction and advantageously have a boiling point at standard pressure in the range from −40° C. to 120° C., preferably from 10° C. to 90° C. Employable organic blowing agents include, for example, acetone, ethyl acetate, methyl acetate, halogen-substituted alkanes such as methylene chloride, chloroform, ethylidene chloride, vinylidene chloride, monofluorotrichloromethane, chlorodifluoromethane, dichlorodifluoromethane, HFCs such as R 134a, R 245fa and R 365mfc, partially halogenated olefins (so-called HFOs or HCFOs) such as trans-1,3,3,3-tetrafluoropropene or trans-1-chloro-3,3,3-trifluoropropene, and also unsubstituted alkanes such as butane, n-pentane, isopentane, cyclopentane, hexane, heptane or diethyl ether. These blowing agents can also be used as mixtures. Suitable inorganic blowing agents include for example air, $CO_2$ or $N_2O$. A blowing effect can also be achieved by addition of compounds which at temperatures above room temperature decompose with elimination of gases, for example nitrogen and/or carbon dioxide, such as azo compounds, for example azodicarbonamide or azoisobutyronitrile, or salts such as ammonium bicarbonate, ammonium carbamate or ammonium salts of organic carboxylic acids, for example the monoammonium salts of malonic acid, boric acid, formic acid or acetic acid. Further examples of blowing agents, particulars concerning the use of blowing agents and criteria for blowing agent selection are described in R. Vieweg, A. Hochtlen (eds.): "Kunststoff-Handbuch", Volume VII, Carl-Hanser-Verlag, Munich 1966, pp. 108f, 453ff and 507-510 as well as in D. Randall, S. Lee (eds.): "The Polyurethanes Book", John Wiley & Sons, Ltd., London 2002, pp. 127-136, pp. 232-233 and p. 261.

The advantageously employable amount of solid blowing agents, low-boiling liquids or gases, each employable individually or in the form of mixtures, for example as liquid or gas mixtures or as gas-liquid mixtures depends on the desired PUR material density and the employed amount of water. The required amounts may be easily determined experimentally. Satisfactory results are typically achieved using solid amounts of 0.5 to 35 parts by weight, preferably 2 to 15 parts by weight, liquid amounts of 1 to 30 parts by weight, preferably 3 to 18 parts by weight, and/or gas amounts of 0.01 to 80 parts by weight, preferably of 10 to 35 parts by weight, in each case based on the weight of the synthesis components 1 and 2. Gas loading with for example air, carbon dioxide, nitrogen and/or helium may be effected either via the formulation components 1, 4 and 5 or via the polyisocyanates 2 or via both 1, 4, 5 and 2.

Employable components 4 include amine catalysts familiar to those skilled in the art, for example tertiary amines such as triethylamine, tributylamine, N-methyl-morpholine, N-ethyl-morpholine, N,N,N',N'-tetramethylethylenediamine, pentamethyldiethylenetriamine and higher homologs (DE-OS 26 24 527 and 26 24 528), 1,4-diaza-bicyclo-(2,2,2)-octane, N-methyl-N'-dimethylaminoethylpiperazine, bis(dimethylaminoalkyl)piperazine (DE-A 26 36 787), N,N-dimethylbenzylamine, N,N-dimethylcyclohexylamine, N,N-diethylbenzylamine, bis(N N-diethylaminoethyladipate, N,N,N',N'-tetramethyl-1,3-butanediamine, N,N-dimethyl-ß-phenylethylamine, bis(dimethylaminopropyl)urea, 1,2-dimethylimidazole, 2-methylimidazole, monocyclic and bicyclic amidines (DE-A 17 20 633), bis(dialkylamino)alkyl ethers (US-A 3 330 782, DE-B 10 30 558, DE-A 18 04 361 and 26 18 280) and tertiary amines comprising amide groups (preferably formamide groups) according to DE-A 25 23 633 and 27 32 292). Suitable catalysts further include Mannich bases known per se and composed of secondary amines, such as dimethylamine, and aldehydes, preferably formaldehyde, or ketones such as acetone, methyl ethyl ketone or cyclohexanone and phenols, such as phenol or alkyl-substituted phenols. Tertiary amines comprising isocyanate-active hydrogen atoms as catalysts include for example triethanolamine, triisopropanolamine, N-methyldiethanolamine, N-ethyldiethanolamine, N,N-dimethylethanolamine, reaction products thereof with alkylene oxides such as propylene oxide and/or ethylene oxide and secondary-tertiary amines according to DE-A 27 32 292. Also employable as catalysts are silaamines having carbon-silicon bonds, as described in U.S. Pat. No. 3,620,984, for example 2,2,4-trimethyl-2-silamorpholine and 1,3-diethyl-aminomethyltetramethyldisiloxane. Nitrogen-containing bases such as tetraalkylammonium hydroxides and hexahydrotriazines are also contemplated. The reaction between NCO groups and Zerewitinoff-active hydrogen atoms is also greatly accelerated by lactams and azalactams by initially forming an adduct between the lactam and the compound comprising acidic hydrogen.

When the catalysis of the polyurethane reaction employs amines as catalysts it must naturally be taken into account that polyoxyalkylene polyol mixtures produced according to the invention under amine catalysis may already contain catalytically active amines. However a person skilled in the art can easily determine the amounts of any amine catalysts still to be added via suitable experimental series.

Also employable as catalysts for this purpose are customary organometallic compounds, preferably organotin compounds such as tin(II) salts of organic carboxylic acids, for example tin(II) acetate, tin(II) octoate, tin(II) ethylhexoate and tin(II) taurate, and, less preferably, the dialkyltin(IV) salts of mineral acids or organic carboxylic acids, for example dibutyltin diacetate, dibutyltin dilaurate, dibutyltin maleate, dioctyltin diacetate and dibutyltin dichloride. Sulfur-containing compounds such as di-n-octyltin mercaptide (U.S. Pat. No. 3,645,927) can also be used.

Catalysts which especially catalyze the trimerization of NCO groups are used for producing polyurethane materials having high proportions of so-called poly(isocyanurate) structures ("PIR foams"). The production of such materials typically employs formulations with significant excesses of NCO groups over OH groups. PIR foams are typically produced at indexes of 180 to 450, wherein the index is defined as the ratio of isocyanate groups to hydroxyl groups multiplied by a factor of 100. Catalysts which contribute to the development of isocyanurate structures are metal salts such as, for example, potassium or sodium acetate, sodium octoate and amino compounds such as 1,3,5-tris(3-dimethylaminopropyl)hexahydrotriazine.

The catalysts/catalyst combinations are generally employed in an amount between about 0.001% and 10% by weight, in particular 0.01% to 4% by weight, based on the total amount of compounds having at least two isocyanate-reactive hydrogen atoms.

In the absence of moisture and physical or chemical blowing agents, compact PUR materials can also be produced.

Additives 5 may optionally be co-used in the production of the compact or foamed PUR materials. Examples include surface-active additives, such as emulsifiers, foam stabilizers, cell regulators, flame retardants, nucleating agents, oxidation retarders, stabilizers, lubricating and demolding agents, dyes, dispersing aids and pigments. Suitable emulsifiers are for example the sodium salts of castor oil sulfonates or salts of fatty acids with amines such as diethylamine oleate or diethanolamine stearate. Alkali metal or ammonium salts of sulfonic acids such as for instance of dodecylbenzenesulfonic acid or dinaphthylmethanedisulfonic acid or of fatty acids such as ricinoleic acid or of polymeric fatty acids can also be used as surface-active additives. Suitable foam stabilizers particularly include polyethersiloxanes. The construction of these compounds is generally such that copolymers of ethylene oxide and propylene oxide are attached to a polydimethylsiloxane radical. Such foam stabilizers may be reactive towards isocyanates or unreactive towards isocyanates due to etherification of the terminal OH groups. They are described for example in U.S. Pat. Nos. 2,834,748, 2,917,480 and 3,629,308. General structures of such foam stabilizers are reproduced in G. Oertel (ed.): "Kunststoff-Handbuch", Volume VII, Carl-Hanser Verlag, Munich, Vienna 1993, pp. 113-115. Of particular interest are polysiloxane-polyoxyalkylene copolymers multiply branched via allophanate groups according to DE-A 25 58 523. Other organopolysiloxanes, ethoxylated alkylphenols, ethoxylated fatty alcohols and paraffin oils, and cell regulators such as paraffins, fatty alcohols and dimethylpolysiloxanes are also suitable. Also suitable for improving emulsifying action, dispersion of the filler, cell structure and/or for stabilization thereof are oligomeric polyacrylates having polyoxyalkylene and fluoroalkane radicals as side groups. The surface-active substances are typically employed in amounts of 0.01 to 5 parts by weight based on 100 parts by weight of the component 1. It is also possible to add reaction retarders, for example acidic substances such as hydrochloric acid or organic acids and acid halides, and pigments or dyes and flame retardants known per se, for example tris(chloroethyl) phosphate, tricresyl phosphate or ammonium phosphate and polyphosphate, furthermore stabilizers against the influence of aging and weathering, plasticizers and fungicidal and bacteriocidal substances. Further examples of surface-active additives and foam stabilizers and cell regulators, reaction retarders, stabilizers, flame retardants, plasticizers, dyes and fillers and fungistatic and bacteriostatic substances for optional co-use according to the invention and details concerning use and mode of action of these additives are described in R. Vieweg and A. Hochtlen (Eds.): Kunststoff-Handbuch, Volume VII, Carl-Hanser Verlag, Munich 1966, pp. 103-113.

To produce the PUR/PIR materials, the ratio of the isocyanate groups in the polyisocyanates 2 to the isocyanate-reactive hydrogens in the components 1, 3, 4 and 5 may be varied within wide ranges. Ratios of 0.7:1 to 5:1 are customary.

The PUR/PIR materials may be produced by the processes described in the literature, for example the one-shot process or the prepolymer process, using mixing devices known in principle to those skilled in the art. The high-functionality polyoxyalkylene polyol mixtures particularly advantageously producible by the process according to the invention may together with polyisocyanates and optionally employable physical blowing agents and using the customary high pressure or low pressure processing machines be made in particular into rigid polyurethane insulation foams used in the insulation of refrigeration apparatuses or buildings for example. The polyoxyalkylene polyol mixtures according to the invention may be supplied to the mechanical mixing apparatus either as an individual component or as a constituent of a previously produced formulation. Their low viscosity makes the polyoxyalkylene polyol mixtures according to the invention particularly advantageous for mechanical processing.

In a first embodiment, the invention a process for producing a polyoxyalkylene polyol mixture comprising at least 3 polyoxyalkylene polyols (a) (b) and (c), wherein the average OH number of the polyoxyalkylene polyol mixture is 290-560 mg KOH/g and the OH number has been determined according to the procedure of DIN 53240;

wherein the calculated average OH number of the polyoxyalkylene polyols (b) and (c) is at least 360 mg KOH/g and the polyoxyalkylene polyol mixture is obtained by reacting a mixture comprising at least one polyoxyalkylene polyol (a), at least one H-functional starter substance (b') and at least one H-functional starter substance (c') with an OH-reactive compound optionally in the presence of a catalyst, wherein the process comprises the steps of
  i) providing a mixture (i) comprising the polyoxyalkylene polyol (a), the H-functional starter substance (b') and the H-functional starter substance (c');
  ii) reacting the mixture (i) with the OH-reactive compound optionally in the presence of the catalyst;

wherein the polyoxyalkylene polyol (a) has a functionality F(a) of 2 to 3 and a calculated OH number of 60 to 168 mg KOH/g;

wherein the H-functional starter substance (b') has a functionality F(b') of 3 to 8 and a calculated molar mass of at least 60 g/mol;

wherein the H-functional starter substance (c') has a functionality F(c') of 3 to 8 and a calculated molar mass of at least 60 g/mol;

wherein the H-functional starter substance (b') is distinct from the H-functional starter substance (c');

wherein the melting temperature of the H-functional starter substance (b') and/or of the H-functional starter substance (c') is less than 150° C. and the calculated number-average functionality of the mixture of the H-functional starter substances (b') and (c') is at least 4.5, and wherein the difference between the calculated average OH number of the polyoxyalkylene polyols (b) and (c) and the OH number of the polyoxyalkylene polyol (a) is between 295 and 405 mg KOH/g.

In a second embodiment, the invention relates to a process according to the first embodiment, wherein the reacting of the mixture (i) with the OH-reactive compound in step (ii) is carried out in the presence of the catalyst.

In a third embodiment, the invention relates to a process according to the first or second embodiment, wherein the catalyst is a basic catalyst, a Brönsted-acidic catalyst, a Lewis-acidic catalyst and/or a double metal cyanide catalyst, preferably a basic catalyst.

In a fourth embodiment, the invention relates to a process according to the third embodiment, wherein the catalyst is a basic catalyst and the basic catalyst is an alkali metal hydroxide, alkaline earth metal hydroxide and/or amine.

In a fifth embodiment, the invention relates to a process according to the fourth embodiment, wherein the basic catalyst is an amine.

In a sixth embodiment, the invention relates to a process according to any of the first to fifth embodiments, wherein the mass fraction of the at least one polyoxyalkylene polyol (a) is 2% to 30% by weight, preferably 5% to 30% by weight, based on the mass of the polyoxyalkylene polyol mixture.

In a seventh embodiment, the invention relates to a process according to any of the first to sixth embodiments, wherein the starter substance (b') has a functionality of 3 to 8 and the starter substance (c') has a functionality of 6 to 8.

In an eighth embodiment, the invention relates to a process according to any of the first to seventh embodiments, wherein at least one of the starter substances (b') or (c') has a melting point of more than 150° C. and one of the starter substances (b') or (c') has a melting point of less than 150° C., wherein the melting points have been determined according to ASTM E324 (November 2016).

In a ninth embodiment, the invention relates to a process according to any of the first to eighth embodiments, wherein the mass fraction of the H-functional starter substance (b') based on the total mass of the H-functional starter substance (b') and the H-functional starter substance (c') is 15% by weight to 40% by weight.

In a tenth embodiment, the invention relates to a process according to any of the first to ninth embodiments, wherein the OH-reactive compound is an alkylene oxide and/or a fatty acid ester, preferably an alkylene oxide.

In an eleventh embodiment, the invention relates to a process according to the tenth embodiment, wherein the OH-reactive compound is an alkylene oxide.

In a twelfth embodiment, the invention relates to a process according to the eleventh embodiment, wherein the alkylene oxide is propylene oxide and/or ethylene oxide, preferably propylene oxide.

In a thirteenth embodiment, the invention relates to a polyoxyalkylene polyol mixture obtainable according to any of the first to twelfth embodiments.

In a fourteenth embodiment, the invention relates to a polyoxyalkylene polyol mixture according to the thirteenth embodiment having a viscosity of 5000-60 000 mPas at 25° C. determined using a rotary viscometer according to the procedure of DIN 53018.

In a fifteenth embodiment, the invention relates to a process for producing polyurethanes by reacting the polyoxyalkylene polyol mixture according to the thirteenth or fourteenth embodiment with a polyisocyanate.

EXAMPLES

Abbreviations

OHN=OH number (hydroxyl number)
Methods:
OH numbers were determined according to the procedure of DIN 53240. All calculated OH numbers relate to the salt-free alkylene oxide adducts.

Viscosities were determined by rotational viscometer (Physica MCR 51, Anton Paar) according to the procedure of DIN 53018.

Molar mass distribution was determined by size exclusion chromatography (SEC). An Agilent 1100 Series instrument from Agilent was used. The polydispersity (PD) is reported for the molecular weight distribution $M_w/M_n$, where $M_w$ is the weight-average molar mass and $M_n$ the number-average molar mass. Further details:

Column combination: 1 PSS pre-column, 5 µl, 8×50 mm; 2 PSS SVD, 5 µl, 100 Å°, 8×300 mm; 2 PSS SVD, 5 µl, 1000 Å°, 8×300 mm, PSS is the manufacturer of the columns (Polymer Standard Service, Mainz)
Evaluation software: WIN GPC from PSS
Solvent: THF (Merck LiChrosolv)
Flow rate: 1 ml/min
Detector Type: RI detector (refractive index), Shodex RI 74
Calibration standards used: Polystyrene-based calibration standard from PSS.

The test results are summarized in table 1.

Example 1, Inventive

A 2 L laboratory autoclave was charged under a nitrogen atmosphere with 375 g of a propylene glycol-started propylene oxide adduct (polyoxyalkylene polyol (a)) having an OHN of 112 mg KOH and 168.8 g of a 70% solution of sorbitol (starter substance (b')) in water. After addition of 5.046 g of a solution (44.89% by weight) of KOH in water and 219.8 g of sucrose (starter substance (c')), the autoclave was sealed, the temperature was increased to 110° C. with stirring (crossbeam stirrer, 100 rpm) and the pressure was reduced to about 80 mbar. After about 15 min, introduction of 50 ml of nitrogen per minute via a distributor ring situated below the liquid level was commenced while the vacuum pump continued to run. This nitrogen introduction ("stripping") was maintained over a period of 3 hours. The stirrer speed was then increased to 800 rpm and at 110° C. metering of altogether 787.2 g of propylene oxide into the head space of the reactor was commenced. The propylene oxide metering phase had a duration of 9.5 h, the metering rate was successively increased from 25 g/h to the end value of 115 g/h and the temperature was raised to 120° C. during the propylene oxide metering. After a postreaction phase of 4.8 hours in duration, the contents of the autoclave were cooled to 80° C. and 5.154 g of an 85% by weight solution of lactic acid in water were added. After addition of 0.760 g of IRGANOX® 1076, the mixture was initially stirred at 80° C. for a further 30 min and then dewatered at 80° C. and 70 mbar over a period of 3 h. The product was finally devolatilized at 110° C. under an oil pump vacuum (5 mbar) over a period of 3 h. This afforded a homogeneous, clear end product having an OHN of 350 mg KOH/g and a viscosity (25° C.) of 10 200 mPas. The difference between the average OH number of the alkylene oxide adducts of the H-functional starter substances (b') and (c') and the OH number of the polyoxyalkylene polyol (a) was 338 mg KOH/g.

Example 2, Inventive

A 2 L laboratory autoclave was charged under a nitrogen atmosphere with 41.8 g of dipropylene glycol and 1.684 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The pressure was then reduced to 100 mbar and the contents of the autoclave were heated to 150° C. with stirring (crossbeam stirrer, 800 rpm). After attaining this temperature, 332.2 g of propylene oxide were metered into the head space of the reactor at a constant metering rate over a period of 3.33 hours. After a postreaction phase of 2.5 h in duration, the mixture was cooled to room temperature. The obtained diol (polyoxyalkylene polyol (a)) had a calculated OH number of 112.6 mg KOH/g. The reactor was then charged under a nitrogen atmosphere with 169.1 g of a 70% solution of sorbitol (starter substance (b')) in water, 3.339 g of a solution (44.89% by weight) of KOH in water and 219.6 g of sucrose (starter substance (c')). The autoclave was sealed, the temperature was increased to 110° C. with stirring (100 rpm) and the pressure was reduced to about 80 mbar. After about 15 min, introduction of 50 ml of nitrogen per minute via a distributor ring situated below the liquid level was commenced while the vacuum pump continued to run. This nitrogen introduction ("stripping") was maintained over a period of 3 hours. The stirrer speed was then increased to 800 rpm and at 110° C. metering of altogether 787.2 g of propylene oxide into the head space of the reactor was commenced. The propylene oxide metering phase had a duration of 9.5 h, the metering rate was successively increased from 25 g/h to the end value of 115 g/h and the temperature was raised to 120° C. during the propylene oxide metering. After a postreaction phase of 3.68 hours in duration, the contents of the autoclave were cooled to 80° C. and 5.133 g of an 85% by weight solution of lactic acid in water were added. After addition of 0.755 g of IRGANOX® 1076, the mixture was initially stirred at 80° C. for a further 30 min and then dewatered at 80° C. and 70 mbar over a period of 3 h. The product was finally devolatilized at 110° C. under an oil pump vacuum (5 mbar) over a period of 3 h. This afforded a homogeneous, clear end product having an OHN of 342 mg KOH/g and a viscosity (25° C.) of 10 300 mPas. The difference between the average OH number of the alkylene oxide adducts of the H-functional starter substances (b') and (c') and the OH number of the polyoxyalkylene polyol (a) was 338 mg KOH/g.

Example 3, Inventive

A 2 L laboratory autoclave was charged under a nitrogen atmosphere with 40.2 g of dipropylene glycol and 0.823 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.63 bar (absolute), 329.4 g of propylene oxide were metered into the head space of the reactor over a period of 7.65 h. After a postreaction phase of 8 h in duration, the obtained intermediate, a diol having a calculated OH number of 100 mg KOH/g (polyoxyalkylene polyol (a)), was devolatilized at 110° C. at a pressure of 15 mbar over a period of 0.51 h and subsequently cooled to 50° C. The reactor was subsequently charged under a nitrogen atmosphere with 169.8 g of a 70% solution of sorbitol in water (starter substance (b')), 223.1 g of sucrose (starter substance c')) and 4.199 g of a solution (44.89% by weight) of KOH in water. The autoclave was sealed, the temperature was increased to 110° C. with stirring (100 rpm) and the pressure was reduced to about 30 mbar. After a dewatering time of 3 h, the vacuum line was sealed and the stirrer speed increased to 800 rpm. Metering of altogether 788.5 g of propylene oxide into the head space of the reactor was commenced at 110° C. The propylene oxide metering phase had a duration of 9.6 h, the metering rate was successively increased from 25 g/h to the end value of 120 g/h and the temperature was raised to 120° C. during the propylene oxide metering. After a postreaction phase of 3.1 h in duration, the contents of the autoclave were devolatilized at 120° C. under reduced pressure (40 mbar) over a period of 1.3 h. After cooling to 80° C., 10.8 g of an 85% by weight solution of lactic acid in water were added. After addition of 0.753 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 368 mg KOH/g and a viscosity (25° C.) of 19 250 mPas. The difference between the average OH number of the alkylene oxide adducts of the H-functional starter substances (b') and (c') and the OH number of the polyoxyalkylene polyol (a) was 353 mg KOH/g.

Example 4, Inventive

A 2 L laboratory autoclave was charged under a nitrogen atmosphere with 53.4 g of dipropylene glycol and 1.649 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.67 bar (absolute), 315.5 g of propylene oxide were metered into the head space of the reactor over a period of 6.32 h. After a postreaction phase of 5 h in duration, the obtained intermediate, a diol having a calculated OH number of 140 mg KOH/g (polyoxyalkylene polyol (a)), was devolatilized at 130° C. at a pressure of 40 mbar over a period of 1.3 h and subsequently cooled to room temperature. The reactor was subsequently charged under a nitrogen atmosphere with 164.6 g of a 70% solution of sorbitol in water (starter substance (b')), 216.5 g of sucrose (starter substance c')) and 3.354 g of a solution (44.89% by weight) of KOH in water. The autoclave was sealed, the temperature was increased to 110° C. with stirring (100 rpm) and the pressure was reduced to about 30 mbar. After a dewatering time of 3.1 h, the vacuum line was sealed and the stirrer speed increased to 800 rpm. Metering of altogether 798.4 g of propylene oxide into the head space of the reactor was commenced at 110° C. The propylene oxide metering phase had a duration of 9.62 h, the metering rate was successively increased from 24 g/h to the end value of 120 g/h and the temperature was raised to 120° C. during the propylene oxide metering. After a postreaction phase of 5.1 h in duration, the contents of the autoclave were devolatilized at 120° C. under reduced pressure (58 mbar) over a period of 0.62 h. After cooling to 80° C., 4.821 g of an 85% by weight solution of lactic acid in water were added. After addition of 0.753 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 377 mg KOH/g and a viscosity (25° C.) of 12 100 mPas. The difference between the average OH number of the alkylene oxide adducts of the H-functional starter substances (b') and (c') and the OH number of the polyoxyalkylene polyol (a) was 300 mg KOH/g.

Example 5, Inventive

A 2 L laboratory autoclave was charged under a nitrogen atmosphere with 41.0 g of dipropylene glycol and 1.900 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.66 bar (absolute), 329.4 g of propylene oxide were metered into the head space of the reactor over a period of 6.50 h. After a postreaction phase of 4.5 h in duration, the obtained intermediate, a diol having a calculated OH number of 114.4 mg KOH/g (polyoxyalkylene polyol (a)), was devolatilized at 130° C. at a pressure of 26 mbar over a period of 0.5 h and subsequently cooled to 40° C. The reactor was subsequently charged under a nitrogen atmosphere with 185.3 g of a 70% solution of sorbitol in water (starter substance (b')), 243.5 g of sucrose (starter substance c')) and 3.129 g of a solution (44.89% by weight) of KOH in water. The autoclave was sealed, the temperature was increased to 110° C. with stirring (100 rpm) and the pressure was reduced to about 21 mbar. After a dewatering time of 3.25 h, the vacuum line was sealed and the stirrer speed increased to 800 rpm. Metering of altogether 756.4 g of propylene oxide into the head space of the reactor was commenced at 110° C. The propylene oxide metering phase had a duration of 9.3 h, the metering rate was successively increased from 24 g/h to the end value of 120 g/h and the temperature was raised to 120° C. during the propylene oxide metering. After a postreaction phase of 5.2 h in duration, the contents of the autoclave were devolatilized at 120° C. under reduced pressure (43 mbar) over a period of 1.0 h. After cooling to 80° C., 5.201 g of an 85% by weight solution of lactic acid in water were added. After addition of 0.750 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 404 mg KOH/g and a viscosity (25° C.) of 28 700 mPas. The difference between the average OH number of the alkylene oxide adducts of the H-functional starter substances (b') and (c') and the OH number of the polyoxyalkylene polyol (a) was 380 mg KOH/g.

Example 6, Inventive

A 2 L laboratory autoclave was charged under a nitrogen atmosphere with 186.3 g of a propylene glycol-started propylene oxide adduct having an OHN of 112 mg KOH/g (polyoxyalkylene polyol (a)) and 195.0 g of a 70% solution of sorbitol in water (starter substance (b')). After addition of 4.983 g of a solution (44.89% by weight) of KOH in water and 253.5 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 30 mbar. After a dewatering time of 3.5 h, the vacuum line was sealed and the stirrer speed increased to 800 rpm. Metering of altogether 927.9 g of propylene oxide into the head space of the reactor was commenced at 110° C. The propylene oxide metering phase had a duration of 10.7 h, the metering rate was successively increased from 25 g/h to the end value of 115 g/h and the temperature was raised to 120° C. during the propylene oxide metering. After a postreaction phase of 2.8 h in duration, the contents of the autoclave were devolatilized at 120° C. under reduced pressure (57 mbar) over a period of 1.0 h. After cooling to 80° C., 4.579 g of an 85% by weight solution of lactic acid in water were added. After addition of 0.780 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 415 mg KOH/g and a viscosity (25° C.) of 37 900 mPas. The difference between the average OH number of the alkylene oxide adduct of the H-functional starter substances (b') and (c') and the OH number of the polyoxyalkylene polyol (a) was 332 mg KOH/g.

Example 7, Inventive

A 2 L laboratory autoclave was charged under a nitrogen atmosphere with 44.4 g of dipropylene glycol and 1.735 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.76 bar (absolute), 323.9 g of propylene oxide were metered into the head space of the reactor over a period of 6.50 h. After a postreaction phase of 3.9 h in duration, the obtained intermediate, a diol having a calculated OH number of 120.8 mg KOH/g (polyoxyalkylene polyol (a)), was devolatilized at 130° C. at a pressure of 38 mbar over a period of 0.5 h and subsequently cooled to 40° C. The reactor was subsequently charged under a nitrogen atmosphere with 80 g of glycerol (starter substance (b')), 315.1 g of sucrose (starter substance c')) and 3.390 g of a solution (44.89% by weight) of KOH in water. The autoclave was sealed, the temperature was increased to 110° C. with stirring (100 rpm) and the pressure was reduced to about 30 mbar. After a dewatering time of 3.25 h, the vacuum line was sealed and the stirrer speed increased to 800 rpm. Metering of altogether 736.1 g of propylene oxide into the head space of the reactor was commenced at 110° C. The propylene oxide metering phase had a duration of 9.1 h, the metering rate was successively increased from 24 g/h to the end value of 120 g/h and the temperature was raised to 120° C. during the propylene oxide metering. After a postreaction phase of 5.0 h in duration, the contents of the autoclave were devolatilized at 120° C. under reduced pressure (28 mbar) over a period of 1.0 h. After cooling to 80° C., 4.952 g of an 85% by weight solution of lactic acid in water were added. After addition of 0.750 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 405 mg KOH/g and a viscosity (25° C.) of 12 950 mPas. The difference between the average OH number of the alkylene oxide adduct of the H-functional starter substances (b') and (c') and the OH number of the polyoxyalkylene polyol (a) was 374 mg KOH/g.

Example 8, Inventive

A 2 L laboratory autoclave was charged under a nitrogen atmosphere with 44.3 g of dipropylene glycol and 1.755 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.74 bar (absolute), 323.8 g of propylene oxide were metered into the head space of the reactor over a period of 6.30 h. After a postreaction phase of 5.0 h in duration, the obtained intermediate, a diol having a calculated OH number of 120.9 mg KOH/g (polyoxyalkylene polyol (a)), was devolatilized at 130° C. at a pressure of 39 mbar over a period of 1.2 h and subsequently cooled to 40° C. The reactor was subsequently charged under a nitrogen atmosphere with 100 g of glycerol (starter substance (b')), 286.6 g of sucrose (starter substance c')) and 3.349 g of a solution (44.89% by weight) of KOH in water. The autoclave was sealed, the temperature was increased to 110° C. with stirring (100 rpm) and the pressure was reduced to about 30 mbar. After a dewatering time of 3.6 h, the vacuum line was sealed and the stirrer speed increased to 800 rpm. Metering of altogether 743.5 g of propylene oxide into the head space of the reactor was commenced at 110° C. The propylene oxide metering phase had a duration of 9.1 h, the metering rate was successively increased from 24 g/h to the end value of 120 g/h and the temperature was raised to 120° C. during the propylene oxide metering. After a postreaction phase of 4.8 h in duration, the contents of the autoclave were devolatilized at 120° C. under reduced pressure (18 mbar) over a period of 1.0 h. After cooling to 80° C., 4.994 g of an 85% by weight solution of lactic acid in water were added. After addition of 0.758 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 413 mg KOH/g and a viscosity (25° C.) of 8915 mPas. The difference between the average OH number of the alkylene oxide adduct of the H-functional starter substances (b') and (c') and the OH number of the polyoxyalkylene polyol (a) was 374 mg KOH/g.

Example 9, Inventive

A 2 L laboratory autoclave was charged under a nitrogen atmosphere with 184.6 g of a propylene glycol-started propylene oxide adduct having an OHN of 112 mg KOH/g (polyoxyalkylene polyol (a)) and 93.5 g of glycerol (starter substance (b')). After addition of 5.03 g of a solution (44.89% by weight) of KOH in water and 366.8 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 50 mbar. After a dewatering time of 3.5 h, the vacuum line was sealed and the stirrer speed increased to 800 rpm. Metering of altogether 855.6 g of propylene oxide into the head space of the reactor was commenced at 110° C. The propylene oxide metering phase had a duration of 10.0 h, the metering rate was successively increased from 25 g/h to the end value of 120 g/h and the temperature was raised to 120° C. during the propylene oxide metering. After a postreaction phase of 3.3 h in duration, the contents of the autoclave were devolatilized at 120° C. under reduced pressure (67 mbar) over a period of 0.75 h. After cooling to 80° C., 5.270 g of an 85% by weight solution of lactic acid in water were added. After addition of 0.761 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 443 mg KOH/g and a viscosity (25° C.) of 25 850 mPas. The difference between the average OH number of the alkylene oxide adduct of the H-functional starter substances (b') and (c') and the OH number of the polyoxyalkylene polyol (a) was 383 mg KOH/g.

Example 10, Inventive

A 2 L laboratory autoclave was charged under a nitrogen atmosphere with 185.0 g of a propylene glycol-started propylene oxide adduct having an OHN of 112 mg KOH/g (polyoxyalkylene polyol (a)) and 96.7 g of glycerol (starter substance (b')). After addition of 5.046 g of a solution (44.89% by weight) of KOH in water and 379.5 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 20 mbar. After a dewatering time of 3.0 h, the vacuum line was sealed and the stirrer speed increased to 800 rpm. Metering of altogether 839.8 g of propylene oxide into the head space of the reactor was commenced at 110° C. The propylene oxide metering phase had a duration of 10.0 h, the metering rate was successively increased from 25 g/h to the end value of 120 g/h and the temperature was raised to 120° C. during the propylene oxide metering. After a postreaction phase of 3.6 h in duration, the contents of the autoclave were devolatilized at 120° C. under reduced pressure (23 mbar) over a period of 1.1 h. After cooling to 80° C., 5.163 g of an 85% by weight solution of lactic acid in water were added. After addition of 0.763 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 457 mg KOH/g and a viscosity (25° C.) of 31 900 mPas. The difference between the average OH number of the alkylene oxide adduct of the H-functional starter substances (b') and (c') and the OH number of the polyoxyalkylene polyol (a) was 400 mg KOH/g.

Example 11, Inventive

A 2 L laboratory autoclave was charged under a nitrogen atmosphere with 53.5 g of dipropylene glycol and 1.700 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.61 bar (absolute), 315.5 g of propylene oxide were metered into the head space of the reactor over a period of 6.30 h. After a postreaction phase of 4.5 h in duration, the obtained intermediate, a diol having a calculated OH number of 141 mg KOH/g (polyoxyalkylene polyol (a)), was devolatilized at 130° C. at a pressure of 27 mbar over a period of 0.5 h and subsequently cooled to about 40° C. The reactor was subsequently charged under a nitrogen atmosphere with 182.0 g of a 70% solution of sorbitol in water (starter substance (b')), 239.0 g of sucrose (starter substance c')) and 3.340 g of a solution (44.89% by weight) of KOH in water. The autoclave was sealed, the temperature was increased to 110° C. with stirring (100 rpm) and the pressure was reduced to about 15 mbar. After a dewatering time of 5.25 h, the vacuum line was sealed and the stirrer speed increased to 800 rpm. Metering of altogether 764.3 g of propylene oxide into the head space of the reactor was commenced at 110° C. The propylene oxide metering phase had a duration of 7.2 h, the metering rate was successively increased from 24 g/h to the end value of 120 g/h and the temperature during the entire propylene oxide metering phase was 120° C. After a postreaction phase of 3.9 h in duration, the contents of the autoclave were devolatilized at 120° C. under vacuum (53 mbar) over a period of 0.67 h. After cooling to 80° C., 5.188 g of an 85% by weight solution of lactic acid in water were added. After addition of 0.762 g of IRGANOX® 1076, the mixture was initially stirred at 80° C. for a further 30 min. The product was finally devolatilized at 110° C. under an oil pump vacuum (5 mbar) over a period of 3 h. This afforded a homogeneous, clear end product having an OHN of 409 mg KOH/g and a viscosity (25° C.) of 21 750 mPas. The difference between the average OH number of the alkylene oxide adduct of the H-functional starter substances (b') and (c') and the OH number of the polyoxyalkylene polyol (a) was 345 mg KOH/g.

Example 12, Inventive

A 2 L laboratory autoclave was charged under a nitrogen atmosphere with 188.0 g of a propylene glycol-started propylene oxide adduct having an OHN of 112 mg KOH/g (polyoxyalkylene polyol (a)) and 94.8 g of glycerol (starter substance (b')). After addition of 2.25 g of N-methylimidazole and 373.6 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 115° C. with stirring (crossbeam stirrer, 800 rpm). Metering of altogether 871.1 g of propylene oxide into the head space of the reactor was commenced at 115° C. The propylene oxide metering phase had a duration of 10.0 hours and the propylene oxide was supplied to the autoclave at a constant metering rate. After a postreaction phase of 2.0 h in duration, the contents of the autoclave were devolatilized at 115° C. under reduced pressure (25 mbar) over a period of 2.0 h. After cooling to 80° C., 0.773 g of IRGANOX® 1076 were added and the mixture was stirred at 80° C. for a further 30 minutes This afforded a homogeneous, clear end product having an OHN of 441 mg KOH/g and a viscosity (25° C.) of 28 300 mPas. The difference between the average OH number of the alkylene oxide adduct of the H-functional starter substances (b') and (c') and the OH number of the polyoxyalkylene polyol (a) was 383 mg KOH/g.

Example 13, Inventive

A 2 L laboratory autoclave was charged under a nitrogen atmosphere with 185.8 g of a glycerol-started propylene oxide adduct having an OHN of 116.5 mg KOH/g (polyoxyalkylene polyol (a)) and 192.2 g of a 70% solution of sorbitol in water (starter substance (b')). After addition of 5.00 g of a solution (44.89% by weight) of KOH in water and 252.5 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 33 mbar. After a dewatering time of 3.3 h, the vacuum line was sealed and the stirrer speed increased to 800 rpm. Metering of altogether 927.9 g of propylene oxide into the head space of the reactor was commenced at 110° C. The propylene oxide metering phase had a duration of 10.7 h, the metering rate was successively increased from 25 g/h to the end value of 120 g/h and the temperature was raised to 120° C. during the propylene oxide metering. After a postreaction phase of 3.7 h in duration, the contents of the autoclave were devolatilized at 120° C. under reduced pressure (27 mbar) over a period of 1.0 h. After cooling to 80° C., 5.143 g of an 85% by weight solution of lactic acid in water were added. After addition of 0.787 g of IRGANOX® 1076, the mixture was initially stirred at 80° C. for a further 30 min. The product was finally devolatilized at 110° C. under vacuum over a period of 3 h. This afforded a homogeneous, clear end product having an OHN of 402 mg KOH/g and a viscosity (25° C.) of 37 900 mPas. The difference between the average OH number of the alkylene oxide adduct of the H-functional starter substances b' and c' and the OH number of the polyoxyalkylene polyol (a) was 324 mg KOH/g.

Example 14, Inventive

A 2 L laboratory autoclave was charged under a nitrogen atmosphere with 100.3 g of a propylene glycol-started propylene oxide adduct having an OHN of 112 mg KOH/g (polyoxyalkylene polyol (a)) and 98.0 g of glycerol (starter substance (b')). After addition of 2.27 g of N-methylimidazole and 385.7 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 115° C. with stirring (crossbeam stirrer, 800 rpm). Metering of altogether 916.6 g of propylene oxide into the head space of the reactor was commenced at 115° C. The propylene oxide metering phase had a duration of 10.0 hours and the propylene oxide was supplied to the autoclave at a constant metering rate. After a postreaction phase of 3.0 h in duration, the contents of the autoclave were devolatilized at 115° C. under reduced pressure (20 mbar) over a period of 1.0 h. After cooling to 80° C., 0.751 g of IRGANOX® 1076 was added and the mixture was stirred at 80° C. for a further 30 minutes This afforded a homogeneous, clear end product having an OHN of 460 mg KOH/g and a viscosity (25° C.) of 39 850 mPas. The difference between the average OH number of the alkylene oxide adduct of the H-functional starter substances (b') and (c') and the OH number of the polyoxyalkylene polyol (a) was 377 mg KOH/g.

Example 15, Comparative

A 2 L laboratory autoclave was charged under a nitrogen atmosphere with 29.524 g of an alkaline prepolymer manufactured from 6.721 g of propylene glycol and 21.222 g of propylene oxide under catalysis of 2.248 g of 100% KOH. After addition of 26.71 g of propylene glycol, the autoclave and the pressure were reduced to 85 mbar. The contents thereof were heated to 110° C. with stirring (crossbeam stirrer, 800 rpm) and after attaining this temperature, 177.4 g of propylene oxide were metered into the head space of the reactor over a period of 1.02 h. After a postreaction phase of 6.0 h in duration, the obtained intermediate, a diol having a calculated OHN of 213 mg KOH/g (polyoxyalkylene polyol (a)), was cooled to room temperature and the reactor was charged under nitrogen with 477.2 g of sucrose (starter substance (c')). Oxygen was removed at room temperature by 5-fold pressurization of the autoclave with nitrogen to an absolute pressure of 3 bar and subsequent release of the positive pressure to standard pressure. After heating the autoclave contents to the reaction temperature of 110° C. and reducing the pressure to 81 mbar, metering of propylene oxide into the head space of the reactor was commenced. Metered addition of altogether 789.3 g of propylene oxide was intended. After 265 g of propylene oxide had been supplied over 5 h and the pressure had increased to 4.8 bar, the experiment was terminated due to the very slow epoxide uptake.

Example 16, Comparative

A 2 L laboratory autoclave was charged under a nitrogen atmosphere with 379.5 g of a propylene glycol-started propylene oxide adduct having an OHN of 112 mg KOH (polyoxyalkylene polyol (a')), 150.1 g of distilled water (starter substance (b')) and 379.6 g of sucrose (starter substance (c')). After addition of 4.011 g of a solution (44.89% by weight) of KOH in water, the autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 800 rpm). Metering of altogether 441.0 g of propylene oxide into the head space of the reactor was subsequently commenced at 110° C. The propylene oxide metering phase had a duration of 6.7 h, the metering rate was successively increased from 25 g/h to the end value of 104 g/h and the temperature was raised to 120° C. during the propylene oxide metering. After a post-reaction phase of 2.1 hours in duration, the contents of the autoclave were cooled to 80° C. and said contents were discharged into a four-necked flask stirred apparatus. Said contents were subsequently dewatered at 80° C. using a water jet pump over a period of 3 hours and 119 g of distillate were collected in the distillate collection vessel. 4.091 g of an 85% by weight solution of lactic acid in water were then added at 80° C. After addition of 0.533 g of IRGANOX® 1076, the mixture was initially stirred at 80° C. for a further 30 min and then dewatered at 80° C. under a water jet vacuum over a period of 3 h. The product was finally devolatilized at 110° C. under an oil pump vacuum (5 mbar) over a period of 3 h. This afforded a biphasic end product which was not further analyzed.

Example 17, Comparative

A 2 L laboratory autoclave was charged under a nitrogen atmosphere with 379.5 g of a propylene glycol-started propylene oxide adduct having an OHN of 112 mg KOH (polyoxyalkylene polyol (a)), 150.0 g of distilled water (starter substance (b')) and 379.6 g of sucrose (starter substance (c')). After addition of 4.605 g of a solution (44.89% by weight) of KOH in water, the autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 800 rpm). Metering of altogether 616.5 g of propylene oxide into the head space of the reactor was subsequently commenced at 110° C. The propylene oxide metering phase had a duration of 8.03 h, the metering rate was successively increased from 25 g/h to the end value of 118 g/h and the temperature was raised to 120° C. during the propylene oxide metering. After a post-reaction phase of 3.0 hours in duration, the contents of the autoclave were cooled to 80° C. and said contents were discharged into a four-necked flask stirred apparatus. Said contents were subsequently dewatered at 80° C. using a water jet pump over a period of 3 hours and 112 g of distillate were collected in the distillate collection vessel. 4.693 g of an 85% by weight solution of lactic acid in water were then added at 80° C. After addition of 0.59 g of IRGANOX® 1076, the mixture was initially stirred at 80° C. for a further 30 min and then dewatered at 80° C. under a water jet vacuum over a period of 3 h. The product was finally devolatilized at 110° C. under an oil pump vacuum (5 mbar) over a period of 3 h. This afforded a biphasic end product which was not further analyzed.

Example 18, Comparative

A 2 L laboratory autoclave was charged under a nitrogen atmosphere with 41.1 g of propylene glycol and 0.949 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The pressure was then reduced to 56 mbar and the contents of the autoclave were heated to 150° C. with stirring (crossbeam stirrer, 800 rpm). After attaining this temperature, 338.4 g of propylene oxide were metered into the head space of the reactor at a constant metering rate over a period of 4.38 hours. After a postreaction phase of 9.2 h in duration, the obtained intermediate, a diol having a calculated OH number of 170 mg KOH/g (polyoxyalkylene polyol (a)), was cooled to room temperature and the reactor was charged under nitrogen with 150.0 g of distilled water (starter substance (b')), 3.776 g of a solution (44.89% by weight) of KOH in water and 379.6 g of sucrose (starter substance (c')). The autoclave was sealed and atmospheric oxygen was removed at room temperature by 5-fold pressurization of the autoclave with nitrogen to an absolute pressure of 3 bar and subsequent release of the positive pressure to standard pressure. The contents were heated to 110° C. with stirring (800 rpm) and after attaining this temperature, metering of altogether 615.5 g of propylene oxide into the head space of the reactor was commenced. The propylene oxide metering phase had a duration of 8.05 h, the metering rate was successively increased from 25 g/h to the end value of 120 g/h and the temperature was raised to 120° C. during the propylene oxide metering. After a post-reaction phase of 3.0 hours in duration, the contents of the autoclave were cooled to 80° C. and said contents were discharged into a four-necked flask stirred apparatus. Said contents were subsequently dewatered at 80° C. using a water jet pump over a period of 3 hours and 110 g of distillate were collected in the distillate collection vessel. 5.025 g of an 85% by weight solution of lactic acid in water were then added at 80° C. After addition of 0.695 g of IRGANOX® 1076, the mixture was initially stirred at 80° C. for a further 30 min and then dewatered at 80° C. under a water jet vacuum over a period of 3 h. The product was finally devolatilized at 110° C. under an oil pump vacuum (5 mbar) over a period of 3 h. This afforded a biphasic end product which was not further analyzed.

Example 19, Comparative

A 2 L laboratory autoclave was charged under a nitrogen atmosphere with 35.8 g of propylene glycol and 1.682 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The pressure was then reduced to 100 mbar and the contents of the autoclave were heated to 150° C. with stirring (crossbeam stirrer, 800 rpm). After attaining this temperature, 338.4 g of propylene oxide were metered into the head space of the reactor at a constant metering rate over a period of 3.4 hours. After a postreaction phase of 13 h in duration the obtained intermediate, a diol having a calculated OH number of 160 mg KOH/g (polyoxyalkylene polyol (a)), was initially evacuated to 80 mbar over a period of 1.25 h and subsequently cooled to 80° C. The reactor was charged under nitrogen with 169.2 g of a 70% solution of sorbitol (starter substance (b')) in water, 3.324 g of a solution (44.89% by weight) of KOH in water and 219.6 g of sucrose (starter substance (c')). The autoclave was sealed, the temperature was increased to 110° C. with stirring (800 rpm) and the pressure was reduced to about 80 mbar. After about 15 min, introduction of 50 mL of nitrogen per minute via a distributor ring situated below the liquid level was commenced while the vacuum pump continued to run. This nitrogen introduction ("stripping") was maintained over a period of 3 hours. Metering of altogether 787.2 g of propylene oxide into the head space of the reactor was subsequently commenced at 110° C. The propylene oxide metering phase had a duration of 9.5 h, the metering rate was successively increased from 25 g/h to the end value of 120 g/h and the temperature was raised to 120° C. during the propylene oxide metering. After a postreaction phase of 4.0 hours in duration, the contents of the autoclave were cooled to 80° C. and 5.133 g of an 85% by weight solution of lactic acid in water were added. After addition of 0.763 g of IRGANOX® 1076, the mixture was stirred at 80° C. for a further 30 min. The contents of the autoclave were discharged into a four-necked flask stirred apparatus and using a water jet pump dewatered therein at 80° C. over a period of 3 hours. The product was finally devolatilized at 110° C. under an oil pump vacuum (5 mbar) over a period of 3 h. The difference between the average OH number of the alkylene oxide adduct of the H-functional starter substances b' and c' and the OH number of the polyoxyalkylene polyol (a) was 290 mg KOH/g. This afforded a biphasic end product which was not further analyzed.

Example 20, Comparative

A 2 L laboratory autoclave was charged under a nitrogen atmosphere with 40.1 g of dipropylene glycol and 0.835 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.54 bar (absolute), 329.4 g of propylene oxide were metered into the head space of the reactor over a period of 6.57 h. After a postreaction phase of 8.5 h in duration, the obtained intermediate, a diol having a calculated OH number of 100 mg KOH/g (polyoxyalkylene polyol (a)), was devolatilized at 110° C. at a pressure of 20 mbar over a period of 0.51 h and subsequently cooled to 50° C. The reactor was subsequently charged under a nitrogen atmosphere with 216.6 g of a 70% solution of sorbitol in water (starter substance (b')), 285.0 g of sucrose (starter substance c')) and 4.153 g of a solution (44.89% by weight) of KOH in water. The autoclave was sealed, the temperature was increased to 110° C. with stirring (100 rpm) and the pressure was reduced to about 19 mbar. After a dewatering time of 3 h, the vacuum line was sealed and the stirrer speed increased to 800 rpm. Metering of altogether 693.9 g of propylene oxide into the head space of the reactor was commenced at 110° C. The propylene oxide metering phase had a duration of 8.7 h, the metering rate was successively increased from 25 g/h to the end value of 120 g/h and the temperature was raised to 120° C. during the propylene oxide metering. After a postreaction phase of 6.5 h in duration, the contents of the autoclave were devolatilized at 120° C. under reduced pressure (40 mbar) over a period of 35 min. After cooling to 80° C., 4.776 g of an 85% by weight solution of lactic acid in water were added. After addition of 0.742 g of IRGANOX® 1076, the mixture was initially stirred at 80° C. for a further 30 min. The product was finally devolatilized at 110° C. under an oil pump vacuum (5 mbar) over a period of 3 h. This afforded a multiphasic, cloudy end product which almost completely solidified at room temperature. OH number and viscosity were not determined. The difference between the average OH number of the alkylene oxide adduct of the H-functional starter substances (b') and (c') and the OH number of the polyoxyalkylene polyol (a) was 478 mg KOH/g.

Example 21, Comparative

A 2 L laboratory autoclave was charged under a nitrogen atmosphere with 40.9 g of dipropylene glycol and 0.836 g of a solution (44.89% by weight) of KOH in water. The autoclave was sealed and oxygen was removed at room temperature by 5-fold pressurization of the autoclave with nitrogen to an absolute pressure of 3 bar and subsequent release of the positive pressure to standard pressure. The contents of the autoclave were heated to 130° C. with stirring (crossbeam stirrer, 800 rpm). After attaining this temperature and at a starting pressure of 1.54 bar (absolute), 329.4 g of propylene oxide were metered into the head space of the reactor over a period of 8.0 h. After a postreaction phase of 9.0 h in duration, the obtained intermediate, a diol having a calculated OH number of 102 mg KOH/g (starter substance a'), was devolatilized at 110° C. at a pressure of 22 mbar over a period of 1.7 h and subsequently cooled to 50° C. The reactor was subsequently charged under a nitrogen atmosphere with 201.5 g of a 70% solution of sorbitol in water (starter substance b'), 265.1 g of sucrose (starter substance c') and 4.170 g of a solution (44.89% by weight) of KOH in water. The autoclave was sealed, the temperature was increased to 110° C. with stirring (100 rpm) and the pressure was reduced to about 30 mbar. After a dewatering time of 3 h, the vacuum line was sealed and the stirrer speed increased to 800 rpm. Metering of altogether 724.0 g of propylene oxide into the head space of the reactor was commenced at 110° C. The propylene oxide metering phase had a duration of 9.3 h, the metering rate was successively increased from 25 g/h to the end value of 120 g/h and the temperature was raised to 120° C. during the propylene oxide metering. After a postreaction phase of 5.5 h in duration, the contents of the autoclave were devolatilized at 120° C. under reduced pressure (50 mbar) over a period of 25 min. After cooling to 80° C., 5.102 g of an 85% by weight solution of lactic acid in water were added. After addition of 0.755 g of IRGANOX® 1076, the mixture was initially stirred at 80° C. for a further 30 min. The product was finally devolatilized at 110° C. under an oil pump vacuum (5 mbar) over a period of 3 h. This afforded a multiphasic, cloudy end product which almost completely solidified at room temperature. OH number and viscosity were not determined. The difference between the average OH number of the alkylene oxide adduct of the H-functional starter substances (b') and (c') and the OH number of the polyoxyalkylene polyol (a) was 436 mg KOH/g.

Example 22, Comparative

A 2 L laboratory autoclave was charged under a nitrogen atmosphere with 186.0 g of a propylene glycol-started propylene oxide adduct having an OHN of 56 mg KOH/g (polyoxyalkylene polyol (a)) and 192.7 g of a 70% solution of sorbitol in water (starter substance (b')). After addition of 5.020 g of a solution (44.89% by weight) of KOH in water and 253.5 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 30 mbar. After a dewatering time of 3.7 h, the vacuum line was sealed and the stirrer speed increased to 800 rpm. Metering of altogether 927.9 g of propylene oxide into the head space of the reactor was commenced at 110° C. The propylene oxide metering phase had a duration of 10.5 h, the metering rate was successively increased from 25 g/h to the end value of 120 g/h and the temperature was raised to 120° C. during the propylene oxide metering. After a postreaction phase of 5.1 h in duration, the contents of the autoclave were devolatilized at 120° C. under reduced pressure (58 mbar) over a period of 1.0 h. After cooling to 80° C., 5.463 g of an 85% by weight solution of lactic acid in water were added. After addition of 0.760 g of IRGANOX® 1076, the mixture was initially stirred at 80° C. for a further 30 min. The product was finally devolatilized at 110° C. under an oil pump vacuum (5 mbar) over a period of 3 h. This afforded a cloudy end product. The OH number determination was not reliably performable due to the inhomogeneity. The difference between the average OH number of the alkylene oxide adduct of the H-functional starter substances (b') and (c') and the OH number of the polyoxyalkylene polyol (a) was 386 mg KOH/g.

Example 23, Comparative

A 2 L laboratory autoclave was charged under a nitrogen atmosphere with 185.3 g of a propylene glycol-started propylene oxide adduct having an OHN of 56 mg KOH/g (polyoxyalkylene polyol (a)) and 168.2 g of a 70% solution of sorbitol in water (starter substance (b')). After addition of 5.011 g of a solution (44.89% by weight) of KOH in water and 221.2 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 40 mbar. After a dewatering time of 3.5 h, the vacuum line was sealed and the stirrer speed increased to 800 rpm. Metering of altogether 975.8 g of propylene oxide into the head space of the reactor was commenced at 110° C. The propylene oxide metering phase had a duration of 10.9 h, the metering rate was successively increased from 25 g/h to the end value of 120 g/h and the temperature was raised to 120° C. during the propylene oxide metering. After a postreaction phase of 4.9 h in duration, the contents of the autoclave were devolatilized at 120° C. under reduced pressure (58 mbar) over a period of 3.0 h. After cooling to 80° C., 5.160 g of an 85% by weight solution of lactic acid in water were added. After addition of 0.785 g of IRGANOX® 1076, the mixture was initially stirred at 80° C. for a further 30 min. The product was finally devolatilized at 110° C. under an oil pump vacuum (5 mbar) over a period of 3 h. This afforded a cloudy end product whose OH number and viscosity were not determined. The difference between the average OH number of the alkylene oxide adduct of the H-functional starter substances (b') and (c') and the OH number of the polyoxyalkylene polyol (a) was 344 mg KOH/g.

Example 24, Comparative

A 2 L laboratory autoclave was charged under a nitrogen atmosphere with 184.8 g of a propylene glycol-started propylene oxide adduct having an OHN of 112 mg KOH/g (polyoxyalkylene polyol (a)) and 102.2 g of glycerol (starter substance (b')). After addition of 5.026 g of a solution (44.89% by weight) of KOH in water and 401.8 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 20 mbar. After a dewatering time of 3.0 h, the vacuum line was sealed and the stirrer speed increased to 800 rpm. Metering of altogether 811.8 g of propylene oxide into the head space of the reactor was commenced at 110° C. The propylene oxide metering phase had a duration of 9.6 h, the metering rate was successively increased from 25 g/h to the end value of 120 g/h and the temperature was raised to 120° C. during the propylene oxide metering. After a postreaction phase of 4.0 h in duration, the contents of the autoclave were devolatilized at 120° C. under reduced pressure (28 mbar) over a period of 1.0 h. After cooling to 80° C., 5.188 g of an 85% by weight solution of lactic acid in water were added. After addition of 0.769 g of IRGANOX® 1076, the mixture was initially stirred at 80° C. for a further 30 min. The product was finally devolatilized at 110° C. under vacuum (20 mbar) over a period of 3 h. This afforded a cloudy end product virtually solid at room temperature having an OHN of 482 mg KOH/g and a viscosity (50° C.) of 3605 mPas. The difference between the average OH number of the alkylene oxide adduct of the H-functional starter substances (b') and (c') and the OH number of the polyoxyalkylene polyol (a) was 430 mg KOH/g.

Example 25, Comparative (According to DE 102 37 910 A1 and DE 102 37 914 A1)

A 2 L laboratory autoclave was charged under a nitrogen atmosphere with 166.9 g of a 70% solution of sorbitol in water (starter substance (b')). After addition of 5.032 g of a solution (44.89% by weight) of KOH in water and 350.5 g of sucrose (starter substance (c')), the autoclave was sealed. Oxygen was removed at room temperature by 5-fold pressurization of the autoclave with nitrogen to an absolute pressure of 3 bar and subsequent release of the positive pressure to standard pressure. The contents of the autoclave were heated to 110° C. with stirring (crossbeam stirrer, 100 rpm) and the pressure was reduced to about 40 mbar. After a dewatering time of 3.5 h, the vacuum line was sealed and the stirrer speed increased to 800 rpm. Metering of altogether 1033.0 g of propylene oxide into the head space of the reactor was commenced at 110° C. The propylene oxide metering phase had a duration of 11.7 h; due to the initially poor uptake of the propylene oxide, the metering had to be completely terminated 3 times and only towards the end could continuous metering be achieved at up to 150 g/h. The reaction temperature was increased to 120° C. during the propylene oxide metering phase. After a postreaction phase of 3.5 h in duration, the contents of the autoclave were devolatilized at 120° C. under reduced pressure (59 mbar) over a period of 40 min. After cooling to 80° C., 5.133 g of an 85% by weight solution of lactic acid in water were added. After addition of 0.645 g of IRGANOX® 1076, the mixture was initially stirred at 80° C. for a further 30 min. The product was finally devolatilized at 110° C. under an oil pump vacuum (5 mbar) over a period of 3 h. This afforded a clear, homogeneous end product having a measured OH number of 440 mg KOH/g and a viscosity of 107 000 mPas at 25° C.

TABLE 1

Summary of the functionality and OHN of the polyoxyalkylene polyol (a); functionalities of the starter substances b' and c'; average functionality of the starter substances b' and c' and the presence of a starter substance b' or c' with a melting temperature of <150° C. and the resulting OHN, viscosities, OHN differences and the phase characteristics of the polyoxyalkylene polyol mixtures (at room temperature).

| Example | Functionality of the polyoxyalkylene polyol (a) | (calcd.)## OHN of the polyoxyalkylene polyol (a) [mg KOH/g] | Functionality of the starter substance b' | Functionality of the starter substance c' | Average (calcd.) OHN of the polyoxyalkylene polyols b and c [mg KOH/g] | Average functionality of the starter substances b' and c' |
|---|---|---|---|---|---|---|
| 1 (inv.) | 2 | 112 | 6 | 8 | 450 | 7.0 |
| 2 (inv.) | 2 | 112 | 6 | 8 | 450 | 7.0 |
| 3 (inv.) | 2 | 100 | 6 | 8 | 453 | 7.0 |
| 4 (inv.) | 2 | 140 | 6 | 8 | 440 | 7.0 |
| 5 (inv.) | 2 | 114 | 6 | 8 | 495 | 7.0 |
| 6 (inv.) | 2 | 112 | 6 | 8 | 444 | 7.0 |
| 7 (inv.) | 2 | 121 | 3 | 8 | 495 | 5.6 |
| 8 (inv.) | 2 | 121 | 3 | 8 | 495 | 5.2 |
| 9 (inv.) | 2 | 112 | 3 | 8 | 495 | 5.6 |
| 10 (inv.) | 2 | 112 | 3 | 8 | 512 | 5.6 |
| 11 (inv.) | 2 | 141 | 6 | 8 | 486 | 7.0 |
| 12 (inv.) | 2 | 112 | 3 | 8 | 495 | 5.6 |
| 13 (inv.) | 3 | 117 | 6 | 8 | 441 | 7.0 |
| 14 (inv.) | 2 | 112 | 3 | 8 | 489 | 5.4 |
| 15 (comp.) | 2 | 213 | Starter substance b' not available | 8 | n.c. | 8.0 |
| 16 (comp.) | 2 | 112 | 2 (water) | 8 | n.c. | 8.0 |
| 17 (comp.) | 2 | 112 | 2 (water) | 8 | n.c. | <8.0 |
| 18 (comp.) | 2 | 170 | 2 (water) | 8 | n.c. | <8.0 |
| 19 (comp.) | 2 | 160 | 6 | 8 | 450 | 7.0 |
| 20 (comp.) | 2 | 100 | 6 | 8 | 578 | 7.0 |
| 21 (comp.) | 2 | 102 | 6 | 8 | 538 | 7.0 |
| 22 (comp.) | 2 | 56 | 6 | 8 | 442 | 7.0 |
| 23 (comp.) | 2 | 56 | 6 | 8 | 400 | 7.0 |
| 24 (comp.) | 2 | 112 | 3 | 8 | 542 | 5.6 |
| 25 (comp.) | not available | — | 6 | 8 | 440 | 7.2 |

| Example | Melting temperatures of one of the two starter substances b' and c' < 150° C.? | Measured OHN of the polyoxyalkylene polyol mixture [mg KOH/g] | Viscosity of the polyoxyalkylene polyol mixture at 25° C. | OH number difference# [mg KOH/g] | Phase characteristics of the end product (room temperature); |
|---|---|---|---|---|---|
| 1 (inv.) | yes | 350 | 10 200 mPas | 338 | homogeneous, clear; |
| 2 (inv.) | yes | 342 | 10 300 mPas | 338 | homogeneous, clear; |
| 3 (inv.) | yes | 368 | 19 250 mPas | 353 | homogeneous, clear; |
| 4 (inv.) | yes | 377 | 12 100 mPas | 300 | homogeneous, clear; |
| 5 (inv.) | yes | 404 | 28 700 mPas | 381 | homogeneous, clear; |
| 6 (inv.) | yes | 415 | 37 900 mPas | 332 | homogeneous, clear; |
| 7 (inv.) | yes | 405 | 12 950 mPas | 374 | homogeneous, clear; |
| 8 (inv.) | yes | 413 | 8915 mPas | 374 | homogeneous, clear; |
| 9 (inv.) | yes | 443 | 25 850 mPas | 383 | homogeneous, clear; |
| 10 (inv.) | yes | 457 | 31 900 mPas | 400 | homogeneous, clear; |
| 11 (inv.) | yes | 409 | 21 750 mPas | 345 | homogeneous, clear; |
| 12 (inv.) | yes | 441 | 28 300 mPas | 383 | homogeneous, clear; |
| 13 (inv.) | yes | 402 | 37 900 mPas | 324 | homogeneous, clear; |
| 14 (inv.) | yes | 460 | 39 850 mPas | 377 | homogeneous, clear; |
| 15 (comp.) | no | n.d. | n.d. | n.c. | n.c. |
| 16 (comp.) | yes | n.d. | n.d. | n.c. | biphasic |
| 17 (comp.) | yes | n.d. | n.d. | n.c. | biphasic |
| 18 (comp.) | yes | n.d. | n.d. | 330 | biphasic |
| 19 (comp.) | yes | n.d. | n.d. | 290 | biphasic |
| 20 (comp.) | yes | n.d. | n.d. | 478 | multiphasic, virtually solid |
| 21 (comp.) | yes | n.d. | n.d. | 436 | multiphasic, virtually solid |

TABLE 1-continued

Summary of the functionality and OHN of the polyoxyalkylene polyol (a); functionalities of the starter substances b' and c'; average functionality of the starter substances b' and c' and the presence of a starter substance b' or c' with a melting temperature of <150° C. and the resulting OHN, viscosities, OHN differences and the phase characteristics of the polyoxyalkylene polyol mixtures (at room temperature).

| 22 (comp.) | yes | n.d. | n.d. | 386 | hazy |
| 23 (comp.) | yes | n.d. | n.d. | 344 | hazy |
| 24 (comp.) | yes | 482 | 3605 mPas at 50° C. | 430 | cloudy, virtually solid |
| 25 (comp.) | yes | 440 | 107 000 mPas at 25° C. | — | homogeneous, clear; | difference between the calculated average OH number of the alkylene oxide adduct of the H-functional starter substances (b') and (c') and the OH number of the polyoxyalkylene polyol (a)
If the polyoxyalkylene polyol (a) was employed directly together with the H-functional starter substances, its OH number determined according to DIN 53240 was reported. If the polyoxyalkylene polyol (a) was produced in situ from a suitable starter compound, its calculated OH number was reported. Details may be found in the corresponding example descriptions.
n.d.: not determined
n.c.: not calculated

The invention claimed is:

1. A process for producing a polyoxyalkylene polyol mixture comprising at least 3 polyoxyalkylene polyols (a) (b) and (c),
   wherein the average OH number of the polyoxyalkylene polyol mixture is 290-560 mg KOH/g as determined according to DIN 53240; and
   wherein the calculated average OH number of the polyoxyalkylene polyols (b) and (c) is at least 360 mg KOH/g and the polyoxyalkylene polyol mixture is obtained by reacting a mixture comprising at least one polyoxyalkylene polyol (a), at least one H-functional starter substance (b') and at least one H-functional starter substance (c') with an OH-reactive compound, optionally in the presence of a catalyst,
   the process comprising:
   i) providing a mixture (i) comprising the polyoxyalkylene polyol (a), the H-functional starter substance (b') and the H-functional starter substance (c'); and
   ii) reacting the mixture (i) with the OH-reactive compound optionally in the presence of the catalyst;
   wherein the polyoxyalkylene polyol (a) has a functionality F(a) of 2 to 3 and a calculated OH number of 60 to 168 mg KOH/g;
   wherein the H-functional starter substance (b') has a functionality F(b') of 3 to 8 and a calculated molar mass of at least 60 g/mol;
   wherein the H-functional starter substance (c') has a functionality F(c') of 3 to 8 and a calculated molar mass of at least 60 g/mol;
   wherein the H-functional starter substance (b') is distinct from the H-functional starter substance (c');
   wherein the melting temperature of the H-functional starter substance (b') and/or of the H-functional starter substance (c') determined according to ASTM E324 (11/2016) is less than 150° C. and the calculated number-average functionality of the mixture of the H-functional starter substances (b') and (c') is at least 4.5,
   and wherein the difference between the calculated average OH number of the polyoxyalkylene polyols (b) and (c) and the OH number of the polyoxyalkylene polyol (a) is between 295 and 405 mg KOH/g.

2. The process according to claim 1, wherein the reacting of the mixture (i) with the OH-reactive compound in step (ii) is carried out in the presence of the catalyst.

3. The process as claimed in claim 1, wherein the catalyst comprises a basic catalyst, a Brönsted-acidic catalyst, a Lewis-acidic catalyst and/or a double metal cyanide catalyst.

4. The process as claimed in claim 3, wherein the catalyst comprises a basic catalyst comprising an alkali metal hydroxide, an alkaline earth metal hydroxide and/or an amine.

5. The process as claimed in claim 4, wherein the basic catalyst comprises an amine.

6. The process as claimed in claim 1, wherein the at least one polyoxyalkylene polyol (a) is present in an amount of 2% to 30% by weight, based on the mass of the polyoxyalkylene polyol mixture.

7. The process as claimed in claim 1, wherein the starter substance (b') has a functionality of 3 to 8 and the starter substance (c') has a functionality of 6 to 8.

8. The process as claimed in claim 1, wherein one of the starter substances (b') or (c') has a melting point of more than 150° C. and one of the starter substances (b') or (c') has a melting point of less than 150° C., as determined according to ASTM E324 (11/2016).

9. The process as claimed in claim 1, wherein the H-functional starter substance (b') is present in an amount of 15 to 40% by weight, based on the total mass of the H-functional starter substance (b') and the H-functional starter substance (c').

10. The process as claimed in claim 1, wherein the OH-reactive compound comprises an alkylene oxide and/or a fatty acid ester.

11. The process as claimed in claim 10, wherein the OH-reactive compound comprises an alkylene oxide.

12. The process as claimed in claim 11, wherein the alkylene oxide comprises propylene oxide and/or ethylene oxide.

13. A polyoxyalkylene polyol mixture obtained by the process of claim 1.

14. The polyoxyalkylene polyol mixture as claimed in claim 13 having a viscosity of 5000-60 000 mPas at 25° C. determined using a rotary viscometer according to the procedure of DIN 53018.

15. A process for producing a polyurethane comprising reacting the polyoxyalkylene polyol mixture according to claim 13 with a polyisocyanate.

* * * * *